United States Patent [19]
Liu et al.

[11] Patent Number: 5,802,398
[45] Date of Patent: *Sep. 1, 1998

[54] METHOD AND APPARATUS FOR ALLOWING COMMUNICATION BETWEEN A HOST COMPUTER AND AT LEAST TWO STORAGE DEVICES OVER A SINGLE INTERFACE

[75] Inventors: Faan-Hoan Liu; Jorge Gustavson, both of Santa Cruz, Calif.

[73] Assignee: Synchrome Technology, Inc., Santa Cruz, Calif.

[*] Notice: This patent issued on a continued prosecution application filed under 37 CFR 1.53(d), and is subject to the twenty year patent term provisions of 35 U.S.C. 154(a)(2).

[21] Appl. No.: 484,949

[22] Filed: Jun. 7, 1995

Related U.S. Application Data

[62] Division of Ser. No. 265,494, Jun. 23, 1994, Pat. No. 5,446,877, which is a continuation of Ser. No. 105,478, Aug. 12, 1993, which is a continuation of Ser. No. 612,540, Nov. 13, 1990.

[51] Int. Cl.[6] ............................................ G06F 13/10
[52] U.S. Cl. ..................... 395/882; 395/825; 395/826
[58] Field of Search ..................... 395/500, 600, 395/280, 620, 427, 821, 825, 826, 828, 882, 884; 711/100

[56] References Cited

U.S. PATENT DOCUMENTS

| | | | |
|---|---|---|---|
| 4,218,757 | 8/1980 | Drogichen | 364/900 |
| 4,583,194 | 4/1986 | Cage | 364/900 |
| 4,607,332 | 8/1986 | Goldberg | 364/300 |
| 4,612,613 | 9/1986 | Gershenson et al. | 364/200 |
| 4,689,767 | 8/1987 | Stevenson et al. | 364/900 |
| 4,727,512 | 2/1988 | Birkner et al. | 364/900 |
| 4,742,448 | 5/1988 | Sander et al. | 364/200 |
| 4,787,030 | 11/1988 | Harter et al. | 364/200 |
| 4,803,623 | 2/1989 | Klashka et al. | 364/200 |
| 4,805,090 | 2/1989 | Coogan | 364/200 |
| 4,814,979 | 3/1989 | Neches | 364/200 |
| 4,975,829 | 12/1990 | Clarey et al. | 364/200 |
| 5,053,945 | 10/1991 | Whisler | 364/200 |
| 5,058,004 | 10/1991 | Ravid | 364/200 |
| 5,113,497 | 5/1992 | Dewa | 395/275 |
| 5,113,500 | 5/1992 | Talbott et al. | 395/325 |
| 5,210,660 | 5/1993 | Hetzler | 360/51 |
| 5,446,877 | 8/1995 | Liu et al. | 395/180 |

*Primary Examiner*—Dennis M. Butler
*Attorney, Agent, or Firm*—Blakely, Sokoloff, Taylor & Zafman

[57] ABSTRACT

A data archival device having an embedded controller compatible with a host computer interface for disk drives having embedded controllers. The data archival device provides for simultaneous writing of data to a tape media coupled with an interface of a host computer while reading of data from a disk coupled with the interface. This simultaneous access to both the tape and disk drives is accomplished through use of an application process for managing access to the tape drive, as well as controlling the tape drive to "own" the interface only during periods of time when information is being communicated over the interface. The tape drive may receive information over the interface into an on-board buffer and then release the interface to allow the host computer to access the disk drive. The tape drive may then continue "off-line" to write data to a tape media or to perform other functions not requiring communication of information over the interface.

30 Claims, 17 Drawing Sheets

|  | COMMAND | COUNT | ADDRESS |
|---|---|---|---|
| 0001: | START TAPE | | |
| 0002: | SYNCH | | |
| 0003: | WAM | | |
| 0004: | WRITE DATA | | |
| 0005: | | | |
| 0006: | | | |
| 0007: | | | |
| 0008: | | | |
| 0009: | | | |
| ⋮ | | | |
| 9999: | | | |

601 → COMMAND  602 → COUNT  603 → ADDRESS

Figure 6

METHOD AND APPARATUS FOR ALLOWING COMMUNICATION BETWEEN A HOST COMPUTER AND AT LEAST TWO STORAGE DEVICES OVER A SINGLE INTERFACE

This is a divisional of application Ser. No. 08/265,494, filed Jun. 23, 1994, now U.S. Pat. No. 5,446,877, which is a continuation of application Ser. No. 08/105,478, filed Aug. 12, 1993, which is a continuation of application Ser. No. 07/612,540, filed Nov. 13, 1990.

FIELD OF THE INVENTION

This present invention relates to data archival systems for use with computer systems and, more specifically, to a tape backup system compatible to be coupled with a hard disk controller on, for example, an IBM PC/AT or compatible.

BACKGROUND OF THE INVENTION

Virtually anyone who uses a computer system, and especially, a personal computer system, has considered the possibility of some hardware failure making data stored on that system inaccessible. The unfortunate among us have not only considered the possibility, but have had the possibility become a reality. Due to this possibility, it is today commonplace to employ some backup (or archival) system to periodically copy data stored in the computer system in order that the data may be restored at a later time in the event of such a hardware failure. In the personal computer world, most commonly, the backup system either employs so-called "floppy disks" onto which data is transferred, through the computers floppy disk drives, for storage or a tape drive which is coupled to the computer and which allows data to be communicated between the computer and tape drive for recording onto a tape medium (e.g., magnetic or optical tape).

In personal computers, such as the IBM PC and compatible family, known tape drives are coupled with the computer through a floppy disk interface. This design is employed largely to save the cost of requiring a separate controller for the tape drive and to avoid occupying one of the computer's slots with a separate tape controller. However utilizing the floppy controller as an interface presents certain problems in the operation and design of a backup system. For example, in the typical IBM PC or compatible, a floppy drive controller is capable of supporting up to two separate drives. Using one of the slots on the floppy drive controller to interface with a tape drive may be undesirable. Further, use of the floppy drive controller allows for a relatively slow interface data rate, e.g., 500 kilobits per second (Kb/s). Present day disk controllers may provide for relatively faster interface data rates, e.g., 5 or more megabits per second (Mb/s). Therefore, it is desired to provide for coupling of a tape drive to a controller having a interface data rate more compatible with present day disk controllers.

Therefore, as one object of the present invention it is desired to provide a tape drive design which allows interfacing a tape drive to a computer system without need to interface through the floppy controller.

It is, of course, possible to provide for interfacing of a tape drive through a separate and relatively faster interface. However, in computer systems such as may utilize the preferred embodiment of the present invention, a separate interface requires use of one of a limited number of "card slots" on the motherboard of the computer system. Users of such computer systems generally prefer to avoid use of card slots whenever possible so that the card slots may be saved for other uses.

Therefore, as a second object of the present invention, it is desired to provide an interface for a tape backup system which does not require use of a separate card slot for interfacing with the host computer.

Recently, an interface has been developed known as the Intelligent Device Electronics (IDE) interface. The IDE interface typically allows for interfacing of at least two hard disk drives, each having an embedded controller. In typical operation, one disk drive may be addressed by the host computer through standard operating system routines in order to access data on that drive. During the time when the disk drive is executing the command to access data, the drive sets a bit indicating the interface is busy, preventing the host computer from issuing additional commands over the interface (e.g., a command to write data to the second device). Therefore, the IDE interface, utilizing standard operating system commands, is relatively incompatible with attempts to couple a tape drive to the device for purposes of "backing up" a disk drive coupled with the interface.

It is therefore, an object of the present invention to provide apparatus and methods for interfacing a tape drive with an IDE interface and to allow simultaneous operation of a disk drive and the tape drive coupled with the interface.

Finally, embedded controller circuits on present day disk drives designed for coupling with the IDE interface typically comprise standard, off-the-shelf, disk controller circuits, such as the Cirrus Logic CL-SH-260 disk controller circuit. It is desired to develop a tape drive utilizing standard, off-the-shelf, disk controller circuits. However, certain incompatibilities exist between outputs provided by such circuits and formats compatible for writing to industry standard tapes.

Therefore, as another object of the present invention, it is desired to provide circuitry for adapting outputs of standard, off-the-shelf, disk controller circuits to provide data compatible for writing industry standard tape formats.

SUMMARY OF THE DISCLOSURE

A data archival system is disclosed which is especially useful in computer systems, for example, in computer systems known as IBM PC's and compatibles therewith. The data archival system preferably comprises a tape backup device coupled with an Intelligent Device Electronics (IDE) interface such as may be available on an IBM PC/AT or compatible.

In particular, the present invention teaches a computer system having an interface for interfacing with at least a first storage device and a second storage device. Preferably the first storage device comprises a disk drive or similar random access storage apparatus. The second storage device preferably comprises a tape drive or similar data archival device. The first storage device comprises a first indicator having a first state for indicating the device is executing a command and a second state for indicating the device is not executing a command. The second storage device comprises a second indicator having a first state for indicating the second device is receiving information over the interface and a second state for indicating the second device is not receiving information over the interface.

Thus, the second device may receive information over the interface and during a period of time associated with receiving the information the second indicator may be in its first state thereby indicating the second device is receiving data. Upon completion of receiving the information, the second indicator may change states to indicate the second device is no longer receiving data. The second device may subsequently process the received information, such as by preferably accessing a storage medium such as tape and either reading or writing information thereto. At the same time, a command may be communicated to the first storage device over the interface; responsive to receiving the first command, the first storage device may set the first indicator means to a first state to indicate it is processing the command. For example, the command may instruct the device to read data from a disk storage media. Upon completion of the command, the first indicator means is returned to a state indicating the first storage device is not executing a command.

It is taught that the second device may continue executing a command after having completed receipt of information through the interface and after having set the second indicator to indicate completion of receipt of such information. For example, the second device may have received a command to write data to tape and, further, the second device may have received such data, for example, into a buffer memory. Subsequent to having received such a command and data, the second device may set its indicator to indicate it has completed receipt of the information and a processor may then direct a command to the first device to read data from a disk. The second device may then continue the process of writing data to tape simultaneously with the first device reading information from disk. Importantly, this simultaneous operation is accomplished while having both the first and second device coupled with a single interface.

The present invention further discloses use of a data archival application process for managing access to an interface having coupled thereto a disk drive and a tape drive wherein the application process initially replaces interrupt vectors pointing to standard ROM BIOS disk service routines with vectors pointing to routines in the data archival application. The application is then able to manage access to the disk service routines. Specifically, during operation the data archival process may call an operating system routine to, for example, read data from the disk for archival onto the tape. The operating system routine attempts to access the disk service routine through the appropriate intercept vector. However, as taught by the present invention, the application has replaced the address in the intercept vector with an address a routine in the archival application. Therefore, the data archival application intercepts the call to the disk service routine. The data archival application then switches control of the interface from the tape drive to the disk drive and then calls the ROM BIOS disk service routines.

In this manner, the data archival application may control simultaneous operation of the disk and tape drive while utilizing the ROM BIOS disk service routines to ensure compatibility.

In addition, a format adapter circuit is disclosed which advantageously allows use of industry standard disk controller circuits in a tape drive and provides for adapting output signals of such disk controller circuits to a format compatible with industry standard tape formats.

These and other aspects of the present invention will be better described with reference to the Detailed Description of the Preferred Embodiment and the accompanying Figures.

BRIEF DESCRIPTION OF THE DRAWINGS

FIG. 6 is a diagram illustrating contents of a write control store as may be utilized by the present invention.

DETAILED DESCRIPTION OF THE PREFERRED EMBODIMENT

A tape backup system is described. In the following description, numerous specific details are set forth such as specific circuits, etc., in order to provide a thorough understanding of the present invention. It will be obvious, however, to one skilled in the art that the present invention may be practiced without these specific details. In other instances, well-known circuits, structures and techniques have not been shown in detail in order not to unnecessarily obscure the present invention.

OVERVIEW

The Computer System of the Preferred Embodiment

Figure 1:
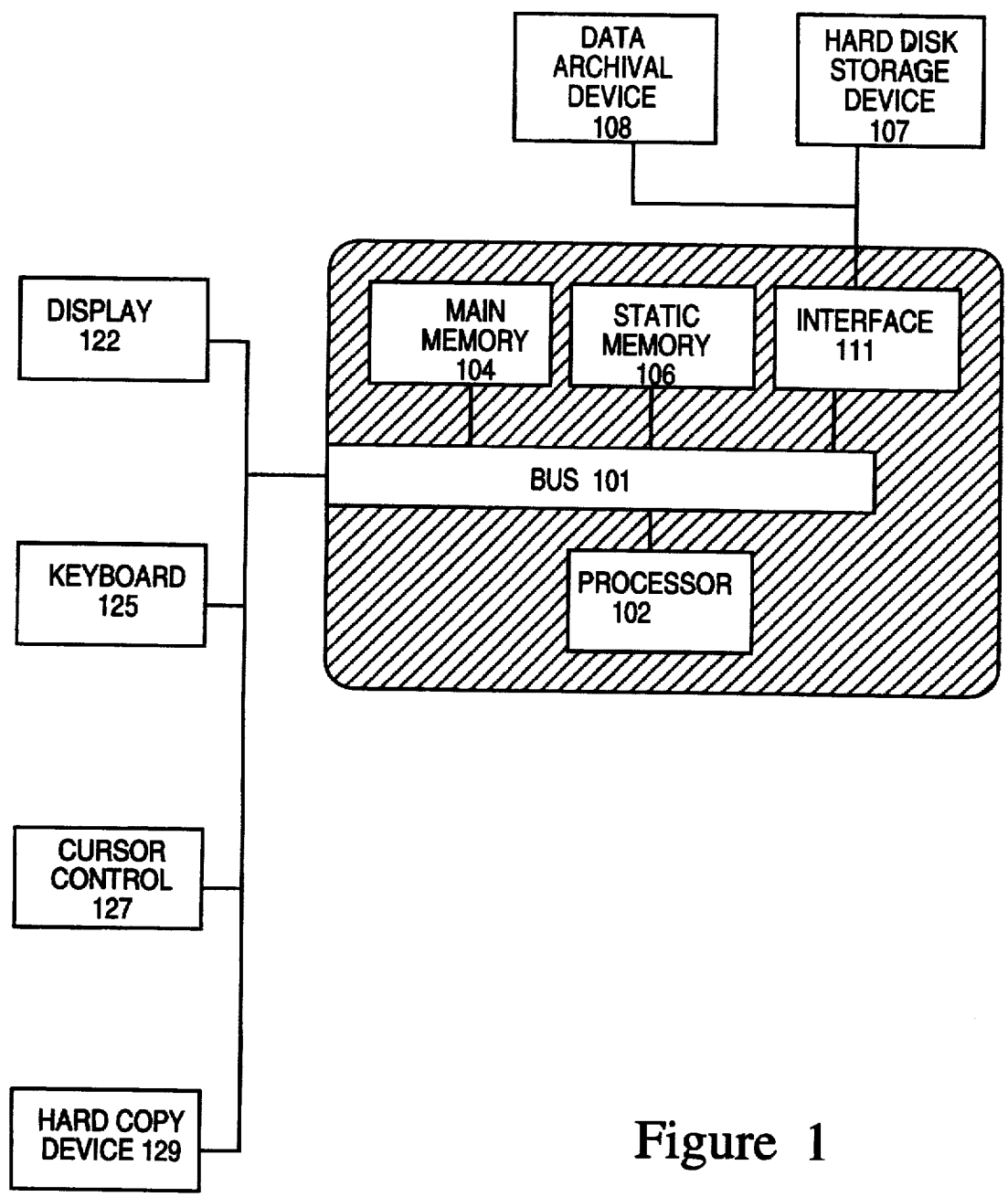
FIG. 1 is a block diagram illustrating a computer system as may be utilized by the present invention.

The overall computer system of preferred embodiment is described with reference to FIG. 1. The preferred embodiment of the present invention is implemented on one of members of the IBM Personal Computer family or computer systems compatible with members of this family. In particular, the computer system of the present invention is implemented on a IBM PC/AT or compatible implementing the Intelligent Drive Electronics (IDE) interface 107 (also known as the "AT-Drive" interface or the ATA (AT attachment) interface. The IDE interface will be discussed in greater detail below. It will, of course, be obvious to one of ordinary skill in the art that any number of other computer systems may employ the teachings of the present invention.

In any event, a computer system as may be utilized by the preferred embodiment generally comprises a bus or other communication means 101 for communicating information, a processing means 102 coupled with the bus 101 for processing information, a random access memory (RAM) or other dynamic storage device 104 (commonly referred to as a main memory) coupled with said bus 101 for storing information and instructions for said processor 102, a read only memory (ROM) or other static storage device 106 coupled with said bus 101 for storing static information and instructions for said processor 102, an interface 111 for allowing coupling of data storage devices, such as hard disk 107 (in addition, as will be seen, a data archival device such as a tape drive may be coupled with the interface), with the bus 100 for storing information and instructions, a display device 122, such as a cathode ray tube, liquid crystal display, etc, coupled to the bus 101 for displaying information to the computer user, an alphanumeric input device 125 including alphanumeric and other keys coupled to said bus 101 for communicating information and command selections to said processor 102, and a cursor control device 127, such as a mouse, track ball, cursor control keys, etc, coupled to said bus 101 for communicating information and command selections to said processor 102 and for controlling cursor movement. Finally, it is useful if the system includes a hardcopy device 129, such as a printer, for providing permanent copies of information. The hardcopy device 129 is coupled with the processor 102, main memory 104, static memory 106 and mass storage device 107 through bus 101.

The processor 102 of the preferred embodiment is one of the 80×86 microprocessor family manufactured by Intel Corporation of Santa Clara, Calif. In the preferred embodiment, the system is operated using a standard IBM PC-compatible operating system such as MS-DOS available from Microsoft Corporation of Beaverton, Oreg.

It will be apparent, from an understanding of the present invention from the below description, that several of the above-mentioned components of the computer system of the preferred embodiment are not essential to operation of a computer system employing aspects of the present invention. For example, as will be described in more detail below, the display 122, keyboard 125, cursor control device 127, and hard copy device 129 may not be present in certain implementations.

The IDE Interface

The IDE interface has evolved from earlier hard disk interfaces in which a hard disk adapter card, including a controller, was installed in a "slot" of a computer system. Such hard disk adapter cards are typically capable of supporting up to two hard disk drives, although only one drive may be written to or read from at a time. The two drives interface to the card through an interface known as the ST506 interface. More recently developed hard disk drives comprise an embedded controller and processor removing the requirement for the adapter card to include its own controller. The interface allowing for use of embedded controllers in a hard disk is known as the IDE or Intelligent Device Electronics interface. The programming model and command codes for the IDE interface are the same as for the ST506 interface; however, as controllers are embedded in the drives themselves, the IDE interface must allow for two controllers to be coupled with the interface and must provide for proper management of information transferred. To manage access to the drives, the IDE interface depends on a status bit (the BUSY bit) in a set of registers (the "task file") associated with each drive. The task file 500 and the BUSY bit 521 of the preferred embodiment are described in greater detail below with reference to FIG. 5.

Figure 2:
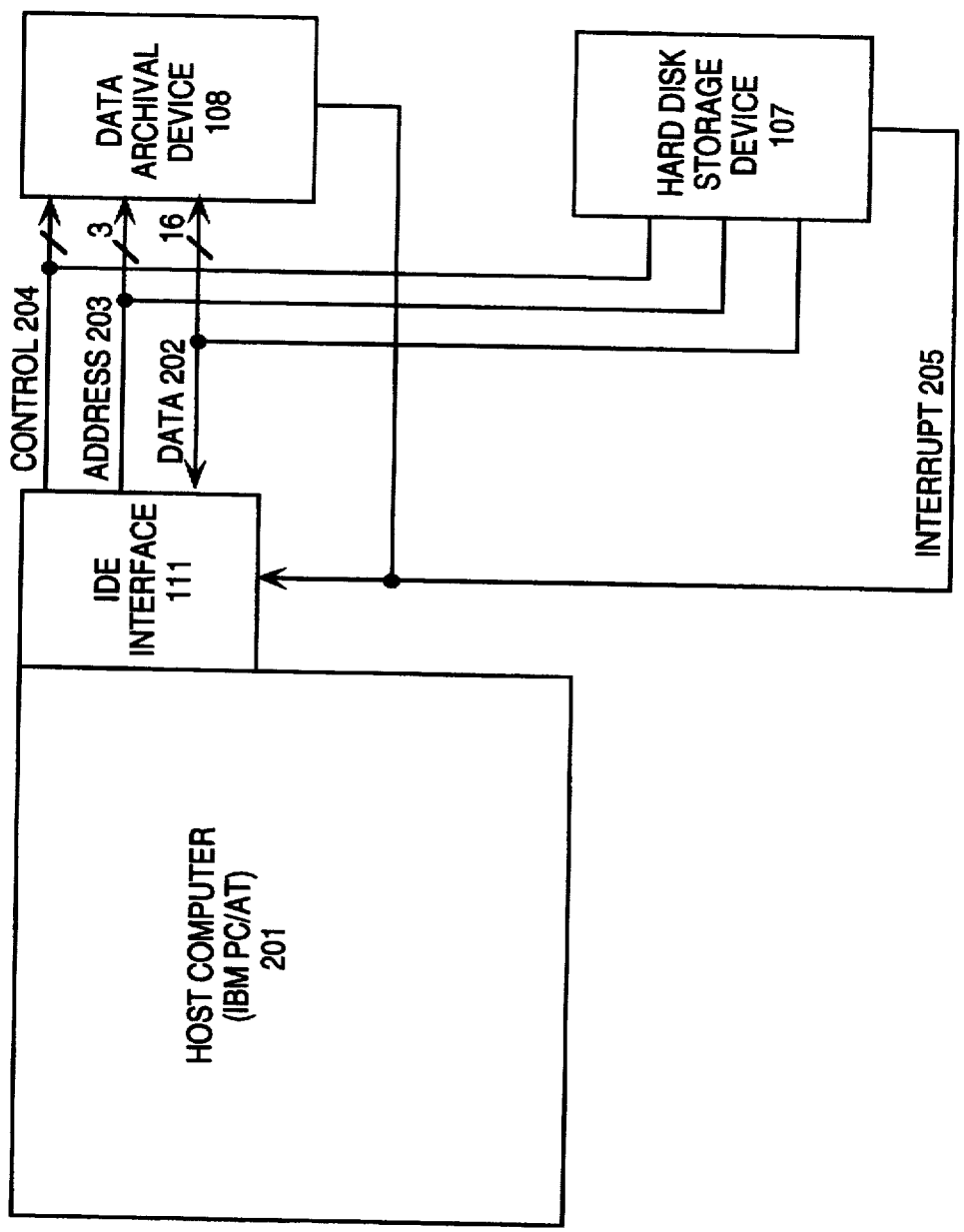
FIG. 2 is a block diagram illustrating coupling of a host computer through an IDE (Intelligent Drive Electronics) interface to a tape drive and a disk drive as is taught by the present invention.

FIG. 2 illustrates in somewhat greater detail the coupling of a data archival device 108 and a hard disk storage device 107 with an IDE interface 111 of a host computer 201. In particular, the data archival device 108 and hard disk storage device 107 are both coupled to communicate data with the host computer 201 over data lines 202. The preferred embodiment provides 16 lines for communication of data between the host computer 201 and devices 107 and 108. In addition, devices 107 and 108 are coupled to receive 3 bits of address information on lines 203 and to receive control information on line 204 through interface 111. The control information comprises read/write strobes, chip select control information and ready signals.

Finally, the devices 107 and 108 are coupled to provide interrupts to the host computer through interface 111 on line 205.

Figure 3:
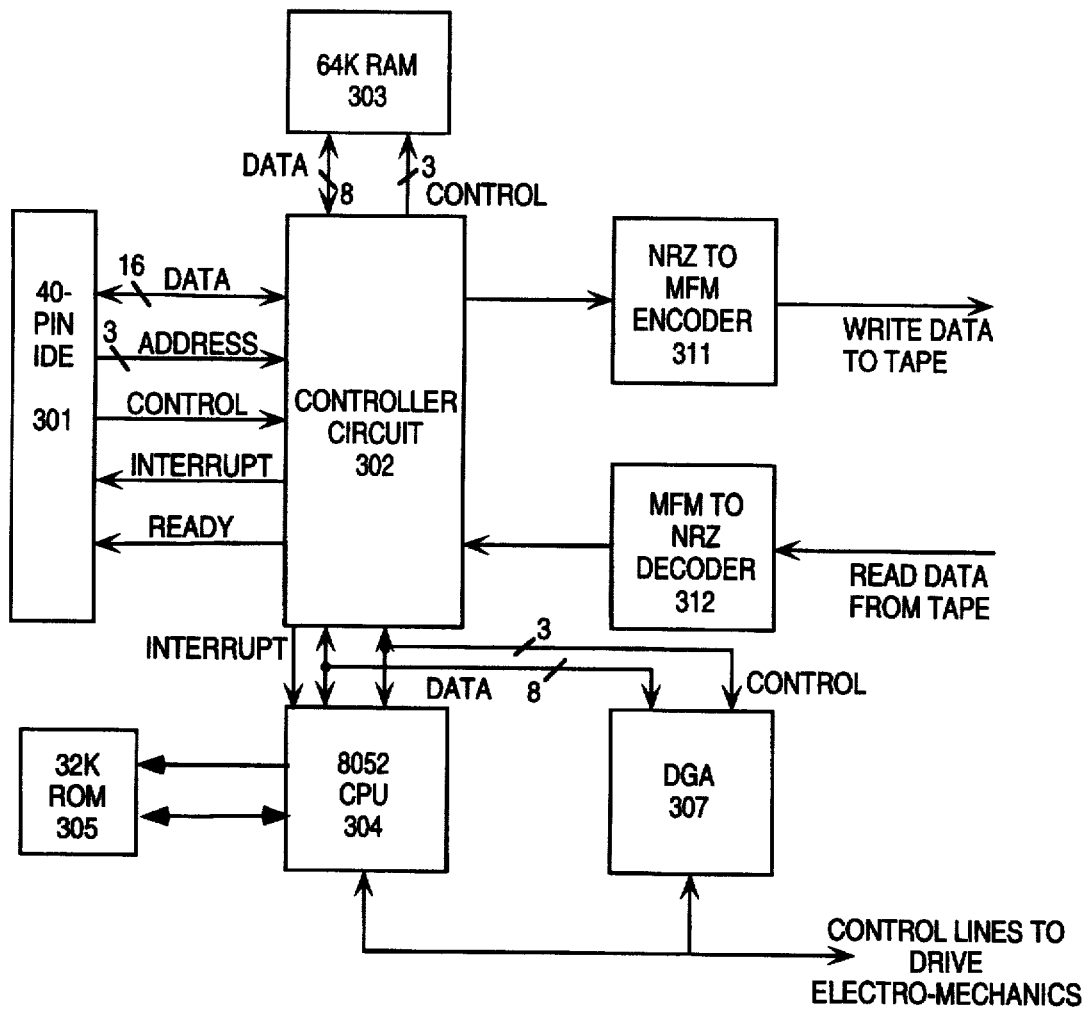
FIG. 3 is a block diagram illustrating components of a tape drive of the present invention.

The circuitry of the data archival device 108 of the preferred embodiment is described in greater detail with reference to FIG. 3. FIG. 3 illustrates the device 108 comprises a connector 301 for coupling with the IDE interface 111 of the host computer 201. The connector 301 is preferably a 40-pin connector and comprises 16 data pins for communicating data information between a controller circuit 302 of the device 108 and the interface 111 of the host computer 201; 3 address pins for receiving address information from the host computer 201 for communication to the circuit 302; a control pin for receiving control information from the computer 201 for communication to the circuit 302; an interrupt pin for signalling interrupts generated by the circuit 302 to the computer 201; and a ready signal line for communicating ready status to the computer 201.

The controller circuit 302 is responsible for communicating information with the host computer over connector 301; for managing access to RAM buffer 303; and for formatting data to be written by the device. In the preferred embodiment, part number CL-SH260 Hard Disk Controller available from Cirrus Logic, Inc. of Milpitas, Calif. is utilized. However, in alternative embodiments it is recognized that alternative circuitry may be utilized. For example, functions of the CL-SH260 may be implemented in discrete circuitry, in a gate array or in a programmed logic array. Further, alternative commercially available circuits may be employed which provide similar or compatible circuity. For example, part number AIC-6060 hard disk controller available from Adaptec may be substituted as a compatible part.

Figure 4:
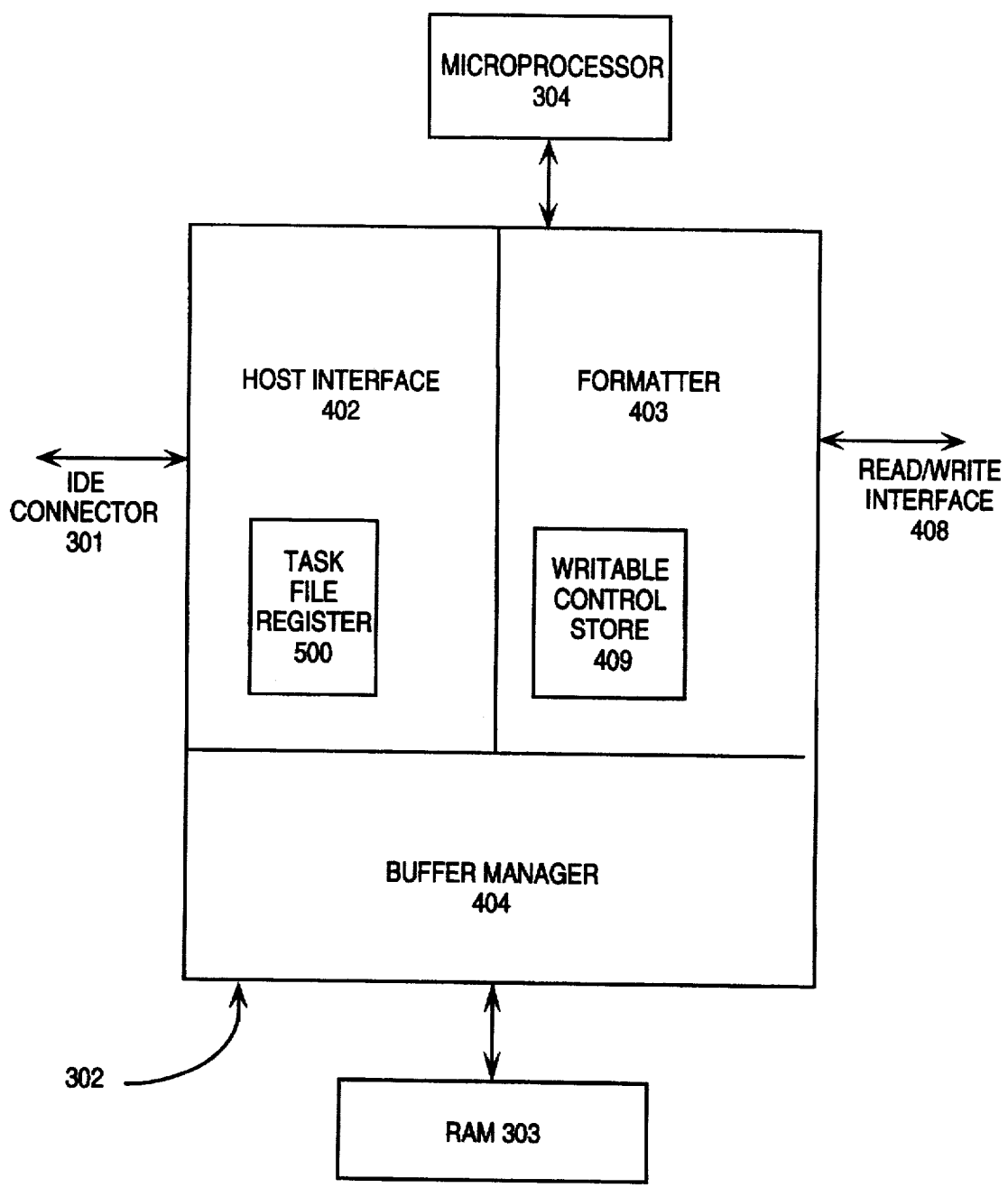
FIG. 4 is a block diagram further illustrating certain components of a tape drive of the present invention including a controller circuit, an IDE interface, a microprocessor, a RAM and a write/read interface.

The controller circuit 302 is illustrated in greater detail with reference to FIG. 4. As previously stated, the controller circuit 302 provides the functions of interfacing with the host computer through host interface section 402; of providing for buffer management of RAM buffer memory 303 through buffer manager section 404; and of providing for formatting data through formatter section 403. The particular workings of each of these sections will be well understood by one of ordinary skill in the art, especially with an understanding of the CL-SH260 controller circuit as utilized by the present invention. Further information on the CL-SH260 controller is available from Cirrus Logic, Inc. as CL-SH-260 Integrated PC XT/AT Disk Controller Data Sheet and Application Notes AN-SHI & AN-SH5. However, it is worthwhile to discuss here that the controller 302 provides registers for the task file 500 as part of host interface 500. The task file register 500 will be described in greater detail below with reference to FIG. 5. Additionally, formatter section 403 provides a writeable control store circuitry 409 for storage of control information. Write control store 409 will be discussed in greater detail below with reference to FIG. 6.

The controller circuit 302 is coupled to communicate control, data and interrupt information with processor 304 and gate array 307. Processor 304 and gate array 307 are provided to control the drive electro-mechanics such as circuitry for controlling tape movement. In the preferred embodiment, the processor 304 is an Intel 8052 microprocessor. Again, it will be apparent to one of ordinary skill in the art that alternative embodiment may employ alternative processing means to provide for control of the controller circuit 302.

In addition to providing for control of the drive electro-mechanics, processor 304 is programmed, via 32K ROM 305, to provide certain control over controller circuit 302. Of particular interest to the present invention, and as will be discussed in greater detail below, processor 304 is programmed to set the BUSY bit whenever information (i.e., a command or data) is being received over the interface and to clear the BUSY bit after the information has been received.

The formatter section 403 of controller 302 is further coupled to provide output information to encoder 311 and to receive input information from decoder 312. In the preferred embodiment, controller 302 is designed to provide output information to encoder 311 and to receive input information from decoder 312 in a format commonly referred to as modified FM or MFM. Encoder 311 is provided to convert the MFM information to non-return to zero (NRZ) format in a well known fashion. Decoder 312 is provided to convert NRZ information back to MFM information for presentation to the controller 302, again in a well known fashion. Encoder 311 and decoder 312 are implemented as programmed logic arrays in the system of the preferred embodiment. Although it is known in prior art hard disk drive systems to provide circuitry for encoding MFM signals and decoding NRZ signals, certain advantages of the encoder 311 and decoder 312 allowing for use of the circuitry of the present invention with a data archival system and, specifically, with a tape drive format as utilized by the preferred embodiment. These advantages will be described in greater detail below with reference to FIGS. 6, 7(a) and 7(b).

The Task File

Figure 5:
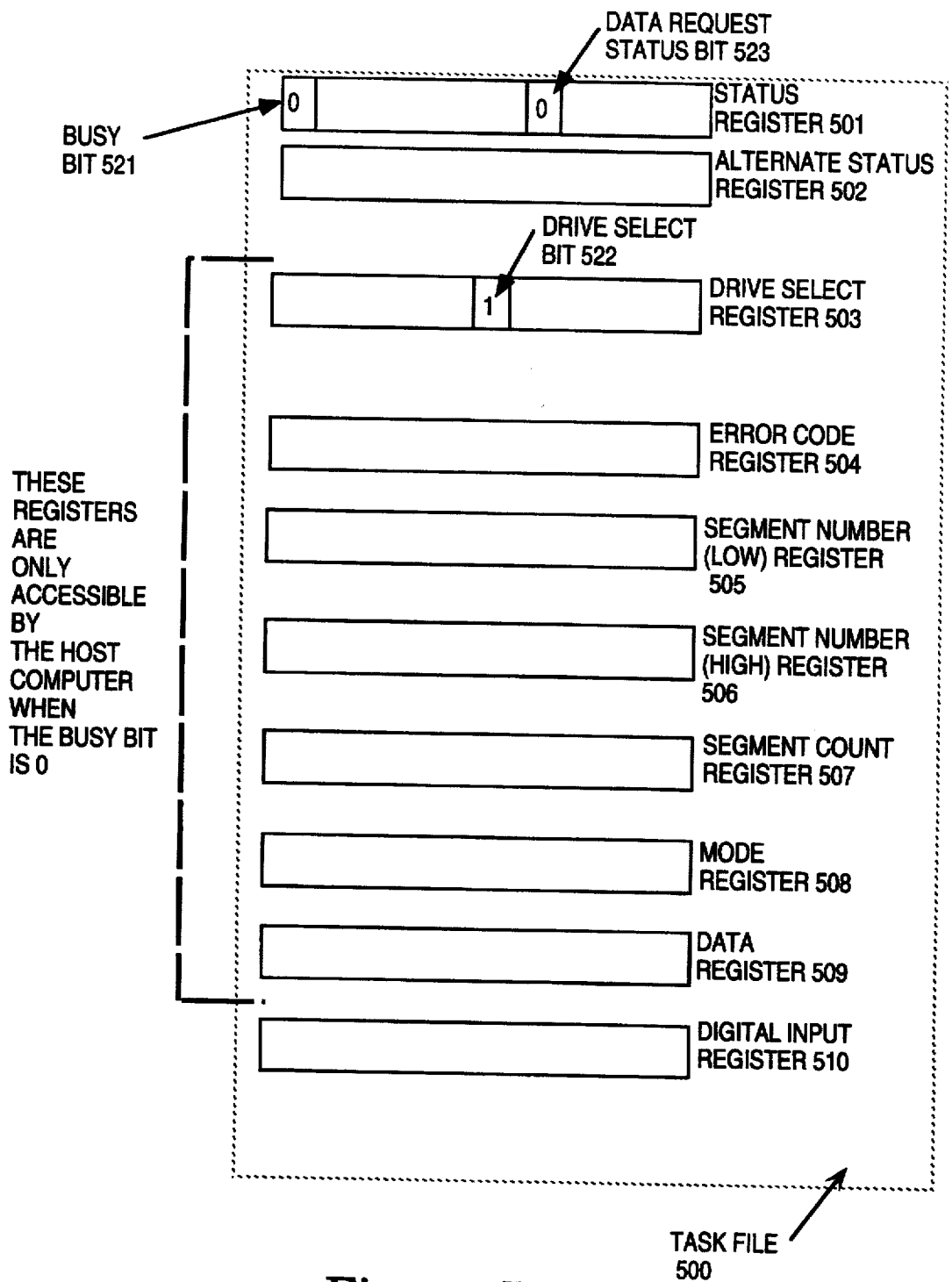
FIG. 5 is a diagram illustrating contents of a task file as may be implemented by the present invention.

As can be seen with reference to FIG. 5, the task file 500 of the preferred embodiment of the present invention comprises ten separate eight-bit registers which may be referred to as (1) the status register 501; (2) the alternate status register 502; (3) the drive select register 503; (4) the error code register 504; (5) the segment number (low) register 505; (6) the segment number (high) register 506; (7) the segment count register 507; (8) the mode register 508; (9) the data register 509; and (10) the digital input register 510.

The Status Register 501

The status register comprises eight indicator bits. Of particular interest to the present invention is the BUSY bit 521 (bit 7 counting from bit 0 at the right). In a typical disk drive operation in the prior art, at the beginning of a command sequence, the BUSY bit 521 is set under the control of a local processor. The BUSY bit 521 remains set until completion of an operation. During the time period when the BUSY bit 521 is set, the host computer is not allowed access to the remaining registers in the task file 500. Further, the host computer may not access any other device coupled with the IDE interface during the time period when one controller coupled with the bus has its BUSY bit 521 set. In essence, the BUSY bit 521 is used as a collision avoidance mechanism and it is assumed in prior art systems utilizing the IDE interface that it is not desirable, and in fact, it is not allowed, to access two devices coupled with the IDE interface simultaneously. After the BUSY bit 521 is cleared, the controller is not allowed to change the contents of the remaining registers of the task file 500. Thus, it is understood that, in prior art systems, the use of the BUSY bit 521 as a contention avoidance mechanism prevents access to one device coupled with an IDE interface when a second device, also coupled with the same IDE interface is busy executing a command. In essence, the interface simulates a situation in which a single controller is available to control access to both devices.

It should be noted that the IDE interface allows for one special case, the SEEK command, in which the controller clears the BUSY bit 521 after beginning execution of the command and prior to its completion. Therefore, a second drive coupled with the IDE interface may be accessed while the SEEK command is executing. Implementation of this special case in the IDE interface requires use of a special status bit (SEEK Complete) in the task file of the disk drive.

As will be seen, the present invention provides capability for simultaneous reading and writing access to a data archival device and a hard disk, both attached to a single IDE interface of a host computer.

The status register is also used as a command register and is written with the command to be executed.

The Drive Select Register 503

The drive select register 503 is written by the host computer to select either one of the two drives coupled with the IDE interface before programming of the task file registers and issuing commands. In the preferred embodiment, a hard disk drive may be attached as drive 0 (also referred to as the "master") and a tape drive may be attached as drive 1 (also referred to as the "slave"). In certain embodiments, such as a system with a secondary IDE channel, the tape drive could be coupled as drive 0. Use of the BUSY bit will be discussed in greater detail below.

In the preferred embodiment, a drive select bit 522 (bit 4 counting from bit 0 being the far right hand bit) is set or cleared to select the desired drive. The remaining bits (bits 0–3 and 5–7) are not used in current implementations.

The Alternate Status Register

The alternate status register 502 is identical to the status register 501; however reading the alternate status register does not acknowledge and clear interrupt requests which are acknowledged and cleared by reading the status register 501. This register is useful where it is desired to be able to inquire into the device status without losing a pending interrupt.

The Error Code Register

The error code register 504 is a two field register indicating error information: an error report pending status bit and a 7-bit error code.

The Data Register

The data register 509 is utilized to allow direct interface with the tape controller's buffer management logic to allow reads or writes with the drives buffer RAM memory.

The Segment Count Register

The segment count register 507 is loaded with a segment count prior to issuing a read or a write command. If a count of zero is loaded, it is interpreted as an indefinite count and the command will continue until terminated by another command. During the transfer of data, the segment count is updated by the tape drive after each segment is transferred, unless an indefinite count is specified.

The Segment Address Registers

The segment address registers 505 and 506 are loaded with a beginning segment address prior to reading or writing to the tape. The segment address is a 16-bit value with the low order eight bits stored in register 505 and the high order eight bits stored in register 506. During multiple segment read and write operations, the segment address is incremented as each transfer is completed.

The Mode Register

The mode register 508 comprises a set of bits to control and report operational modes of the tape drive of the preferred embodiment including a format code, length of tape code, tape cartridge present code, tape cartridge write protected code, interrupt mode select, and a data packing method code.

Simultaneous Operation of the Tape and Disk Drives

Prior art methods of operating data archival devices in, for example, an IBM PC or compatible, provide for coupling the tape drive through a interface separate from the interface for the hard disk. For example, it is common to couple a tape drive to a floppy disk interface. In this way, one interface is available for allowing access to the disk drive while a separate interface is available for allowing access to the tape drive. In this arrangement, the respective interfaces may operate to allow simultaneous operation of the tape and disk drives. However, in certain computer systems it is desirable for a number of reasons to allow for coupling of both a tape and disk drive through a single interface.

Therefore, as one aspect of the present invention it is disclosed to allow coupling of both a tape drive and a disk drive to a single interface while providing for simultaneous operation of both the tape and disk drive.

The BUSY Bit

Figure 15:
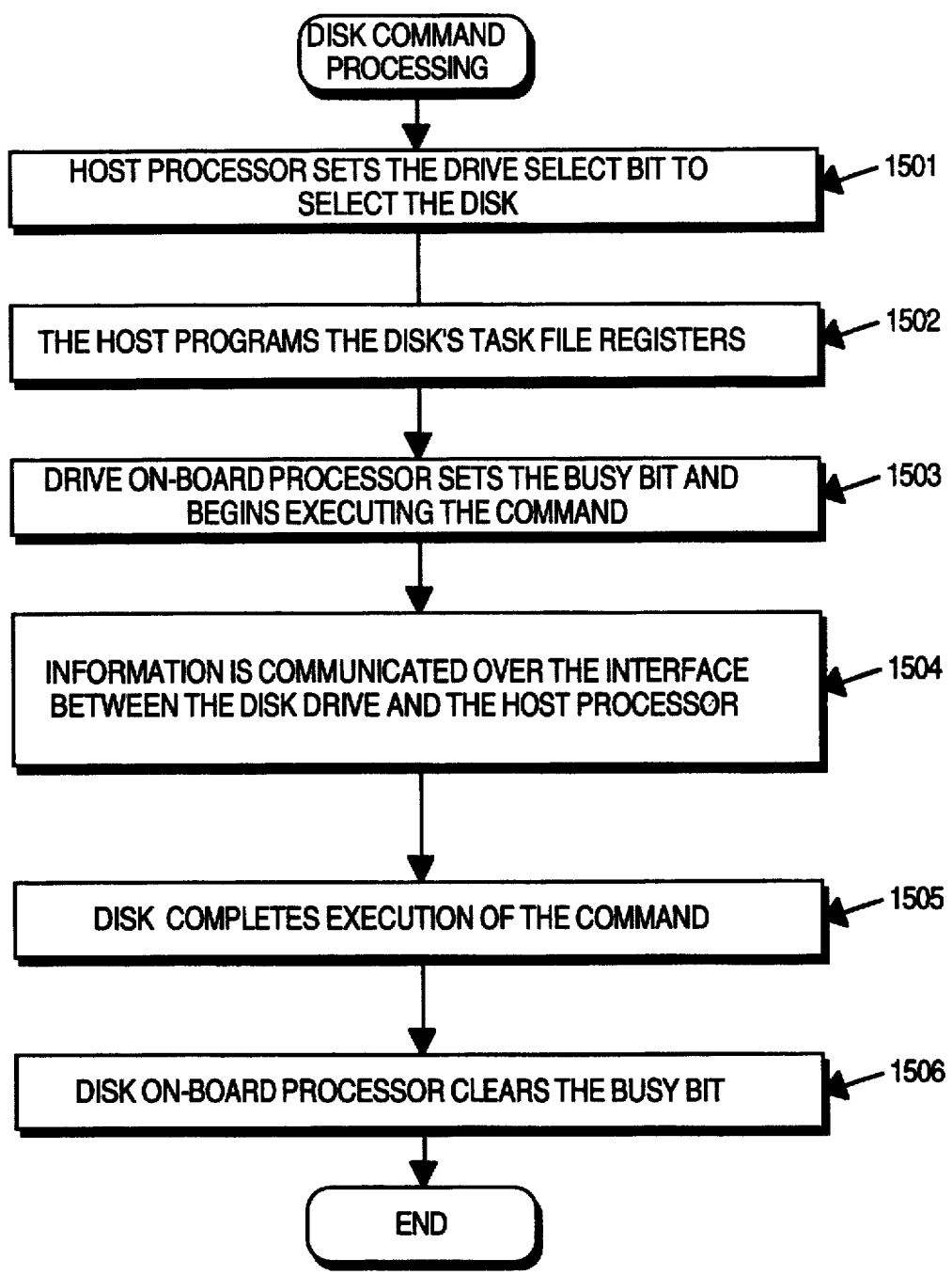
FIG. 15 is a flow diagram illustrating a prior art method of executing commands by a disk drive.

Known devices (e.g., disk devices) which interface with the IDE interface operate by setting their BUSY bit in their status register when the device is executing a command. A well-known processing utilized by disk drives which interface with the IDE interface is illustrated with reference to FIG. 15. First, the host processor sets the drive select bit 522 to select the disk (e.g., in a typical configuration, the host processor sets the drive select bit to 0), block 1522. The host proceeds to program the task file registers of the disk drive to execute the command, block 1502. After the task file registers are programmed by the host, an on-board processor on the drive sets the BUSY bit 521 and begins executing the command. Execution of the command may include communicating (e.g., reading or writing) information over the interface. For example, data to be written to the disk may be communicated by the host processor over the interface to the disk drive. The disk drive may initially accept the data into a buffer memory and then retrieve the data from the buffer memory for writing to disk. Typically, the buffer memory is a higher speed device than the disk itself and, therefore, the host computer may complete transmission of the information before the drive completes execution of the command to write the data to disk. In any event, eventually the disk completes execution of the command, block 1505. Upon completion of the command, the on-board processor clears the BUSY bit, block 1506.

During the period the BUSY bit was set (i.e., from block 1503 through block 1506), the host processor is prevented from accessing registers 503–509 of the task file registers on both the disk drive and tape drive. As a result, during the period in time when the disk drive is executing the command, even after it may have received all necessary information over the interface, the host computer is prevent from accessing the tape drive.

Figure 16:
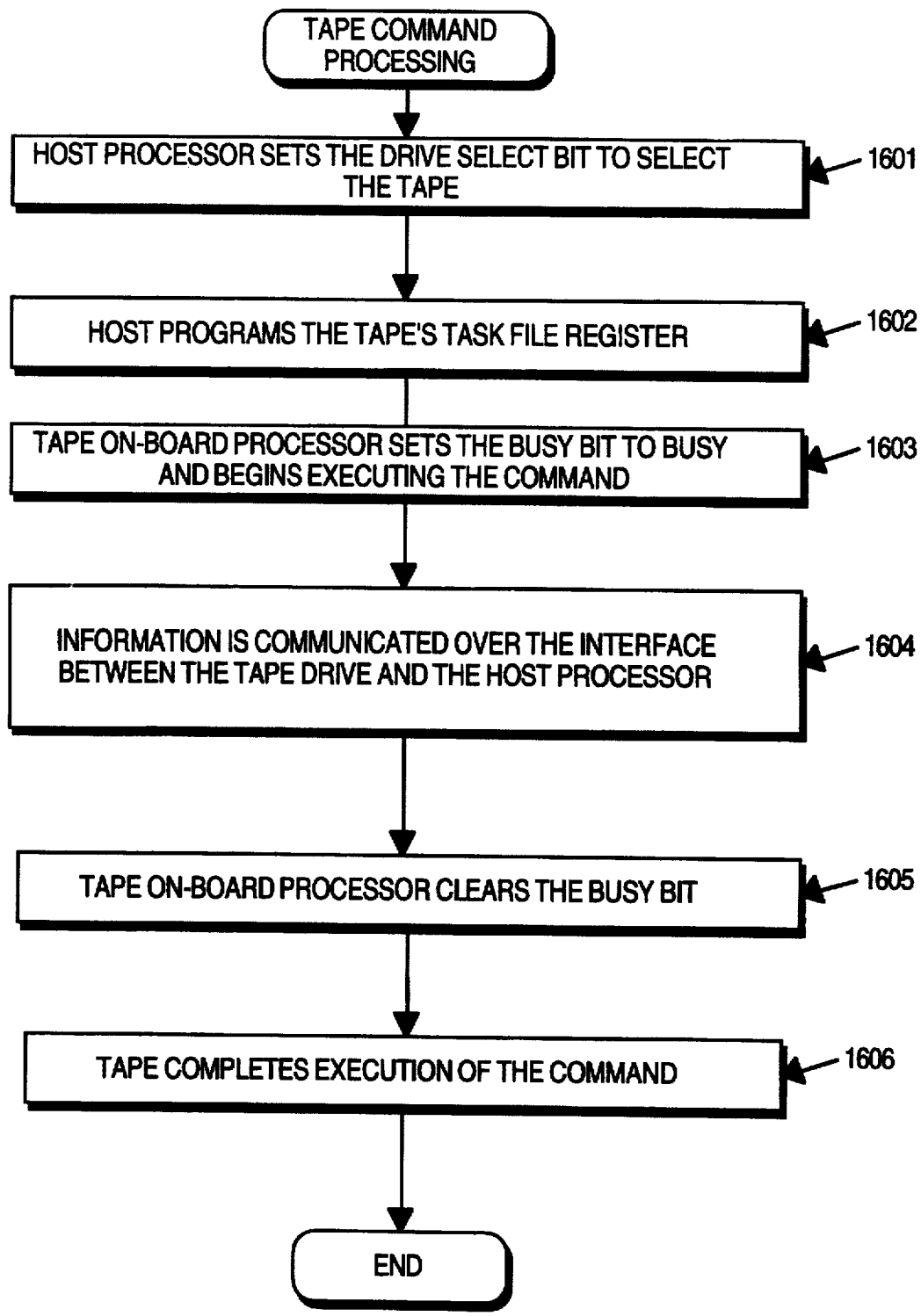
FIG. 16 is a flow diagram illustrating a method of the present invention for executing commands by a tape drive.

FIG. 16 illustrates a method of the present invention for processing commands to the tape drive. Similar to the discussion in connection with FIG. 15, the host processor initially sets the drive select bit to select the tape drive, block 1601, and the host processor programs the tape drives task file register, block 1602. The tape drives on-board processor then sets the BUSY bit 1603 and begins executing the command. For example, the command may be a request to write information to tape, in which case, information is communicated by the host processor, over the interface, to the tape drive, block 1604. After completion of communicating information over the interface, the tape drives on-board processor clears the BUSY bit, block 1605. In the exemplary case of a request to write information to tape, the tape drive may accept information to be written over the interface and temporarily store the information in a relatively high speed buffer memory prior to the information being written to tape. Therefore, the tape drive may not have completed processing of the command prior to clearing the BUSY bit. In any event, at some point in time the tape drive completes execution of the command, block 1606; however, as has been explained, the BUSY bit has been cleared prior to completion of execution of the command. In this way, the host may begin communications with the disk drive while the tape drive completes execution of the command "off-line".

The process of backing up and restoring information in the system of the preferred embodiment will be explained in greater detail with reference to FIGS. 8–14.

The Backup Process

Figure 8:
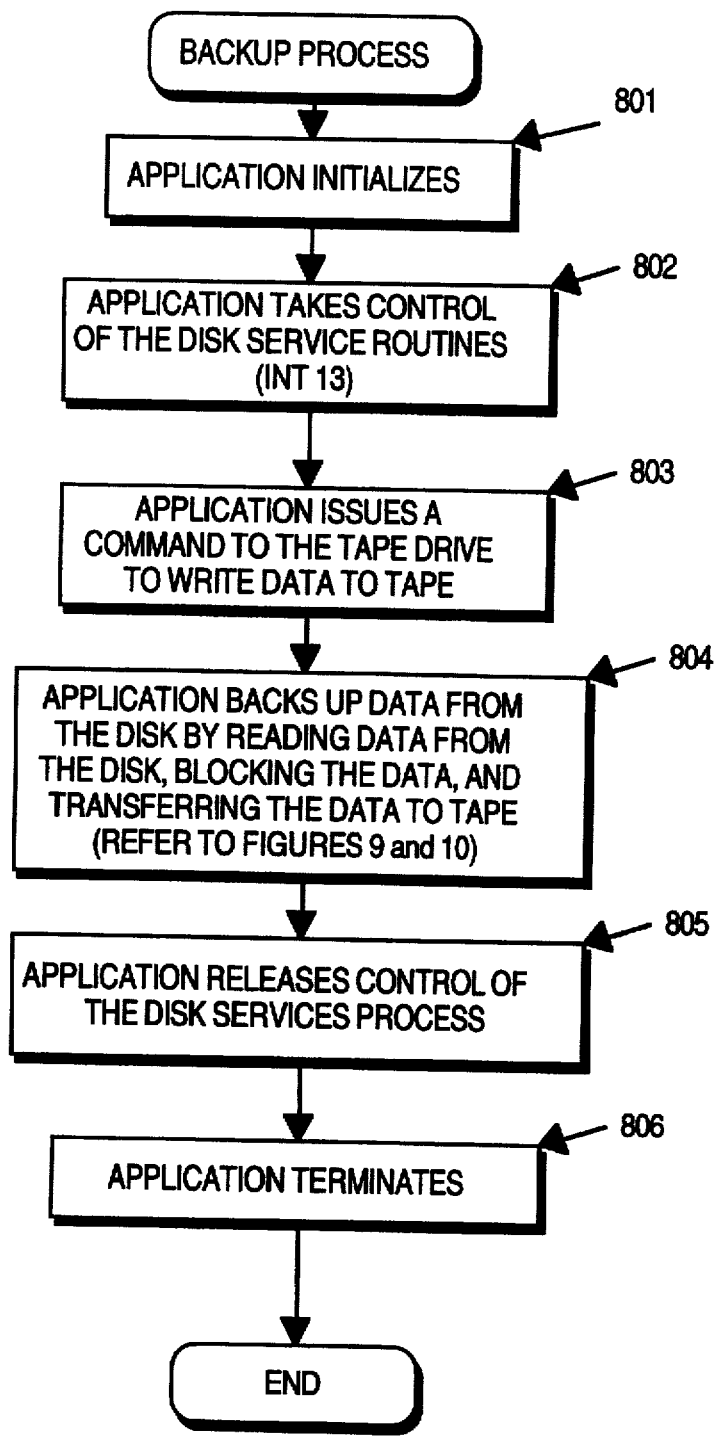
FIG. 8 is a flow diagram illustrating an overall process for backing up a hard disk drive as may be utilized by the present invention.

FIG. 8 is an overall flow diagram of a backup (or data archival) process as may be utilized by the present invention. In the preferred embodiment, an application program is provided to manage the backup process. The application program is initialized in any of a number of well-known manners, block 801. For example, a user may input a command into the host computer to initialize or start-up the application process.

When the application program initializes it determines and stores the addresses of interrupt vectors for the system hard disk interrupt (referred to as INT 14 in the MS-DOS operating system) and the ROM BIOS hard disk service routine (referred to as INT 13 in the MS-DOS operating system). The application program then installs the address of certain of its own routines in place of the addresses of the interrupt vectors; effectively the application program takes control of the disk service routines, block 802. This may be better understood with reference FIG. 14.

Figure 14:
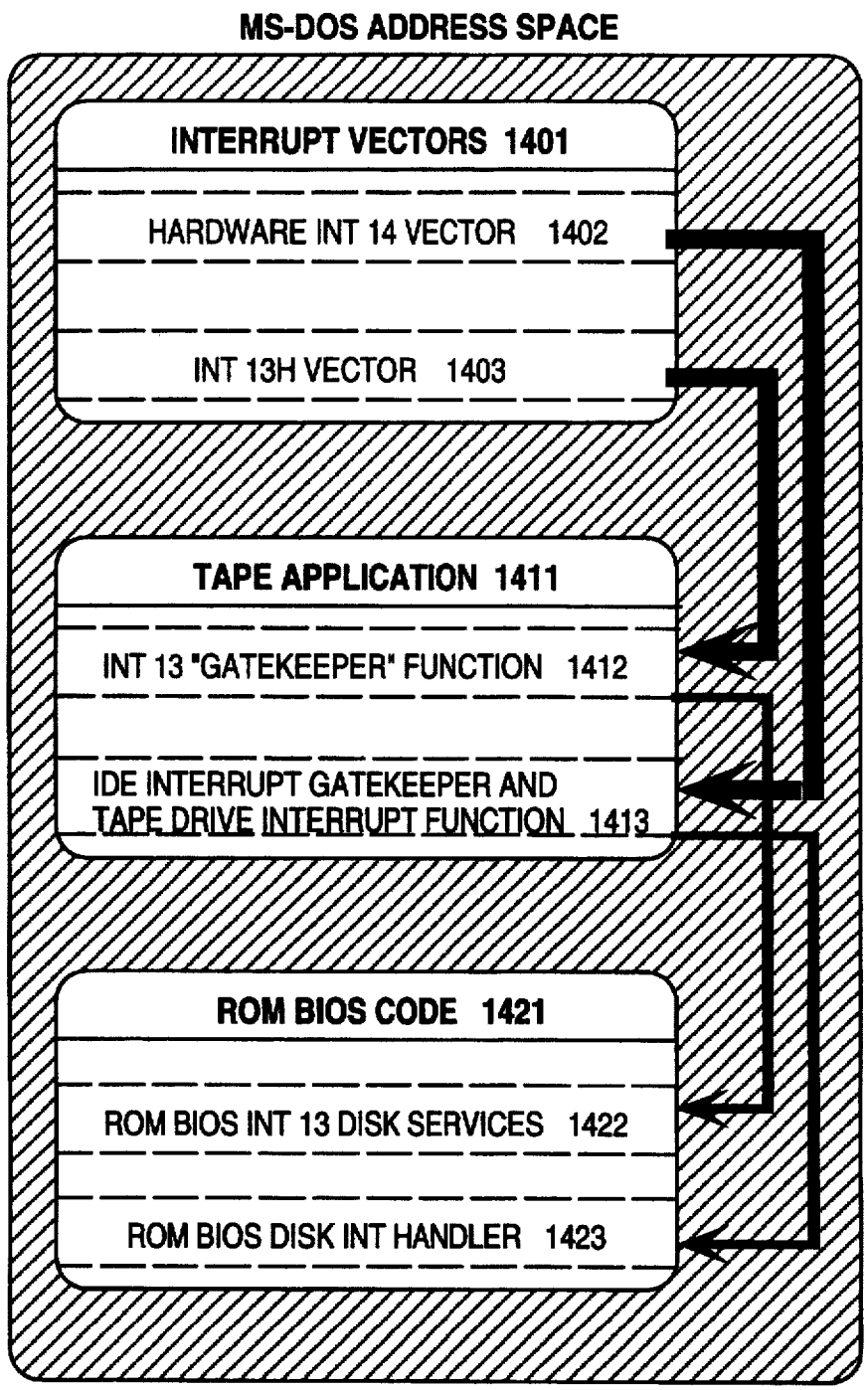
FIG. 14 is a diagram illustrating DOS address space as may be configured by the present invention.

FIG. 14 illustrates certain portions of the address space in an MS-DOS system. The address space includes certain interrupt vectors 1401 including a hard disk interrupt vector (hardware interrupt vector 1402) and a ROM BIOS hard disk service vector (INT 13H vector 1403). During typical operations, vector 1402 is an address pointer to the ROM BIOS disk interrupt handler 1423 in the ROM BIOS code 1421 and vector 1403 is a pointer to ROM BIOS INT 13 disk services handler 1422, again in the ROM BIOS code. However, as mentioned above, when the tape application program initializes, interrupt vector 1402 is changed to point to an interrupt handler routine 1413 in the tape application program 1411 and interrupt vector 1403 is changed to point to a "gatekeeper" routine 1412 in the application program 1413.

As will be explained in greater detail below, these routines allow the application to have its own driver routines for interfacing with the tape drive and to use the ROM BIOS routines for accessing the disk.

The "gatekeeper" routine 1412 ensures that when the operating system (MS-DOS) is accessing the disk, all hardware interrupts are directed to the ROM BIOS's routines for servicing and when the disk is not being accessed, the IDE bus is available for tape drive commands and interrupts.

The IDE interrupt gatekeeper and tape drive interrupt function 1413 allows the application to redirect the hardware interrupt vector 1402 to point to the disk service routine when disk drive operations are being performed and to use the applications own interrupt routines when the tape operations are being performed.

Referring back to FIG. 8, the application program then issues a command to the tape drive to write data to tape (i.e., to backup data) by programming its task file registers, block 803. The application then directs archiving of data from the disk drive to the tape drive by reading data from the disk, blocking the data into 32K blocks, and transferring the data to tape. These functions will be explained in greater detail with reference to FIGS. 9 and 10.

Upon completion of the archival process, the application releases control of the disk service routines by writing the stored addresses for vectors handlers 1422 and 1423 back to vectors 1402 and 1403, respectively, block 805. The application then terminates, block 806.

Figure 9:
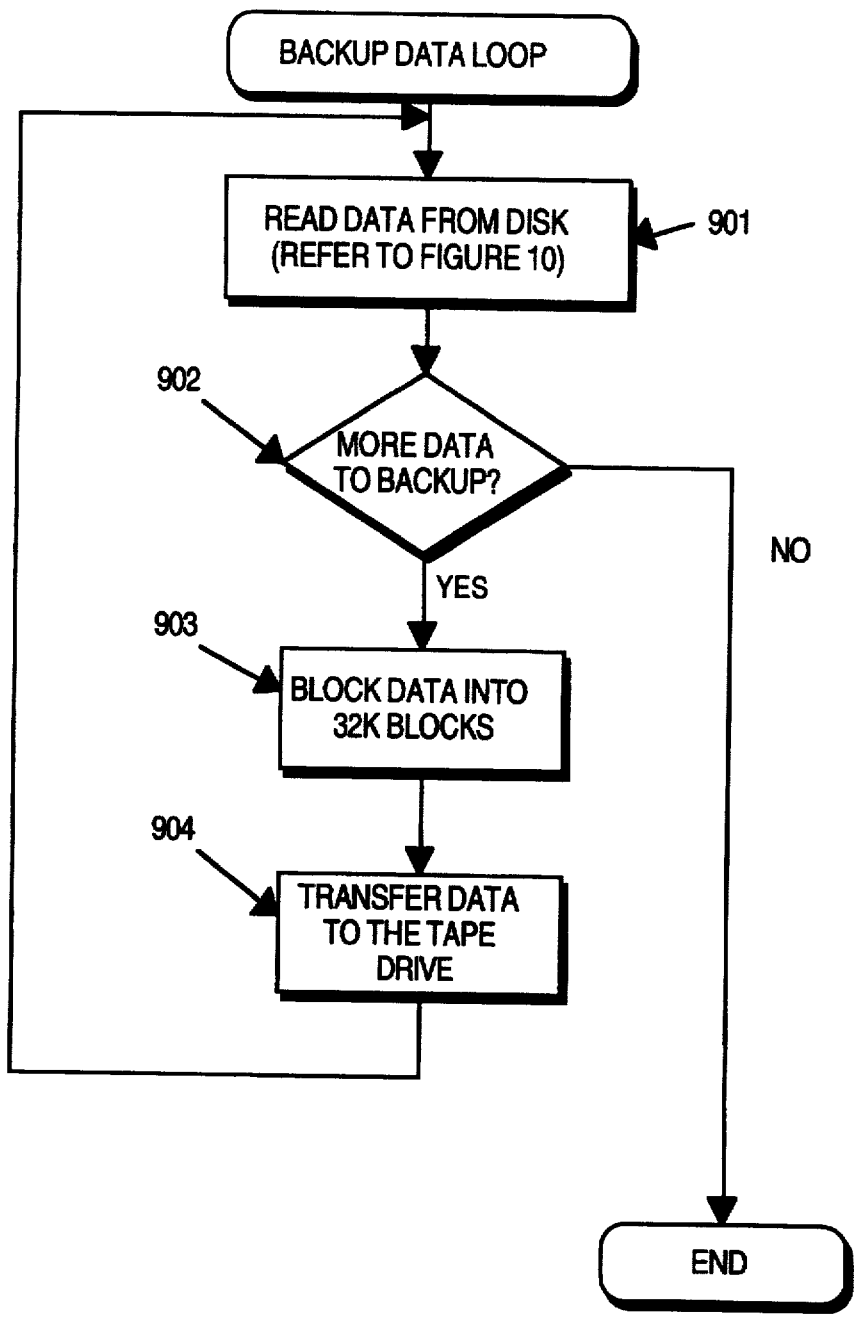
FIG. 9 is a flow diagram illustrating a backup loop of the backup process as may be utilized by the present invention.
Figure 10:
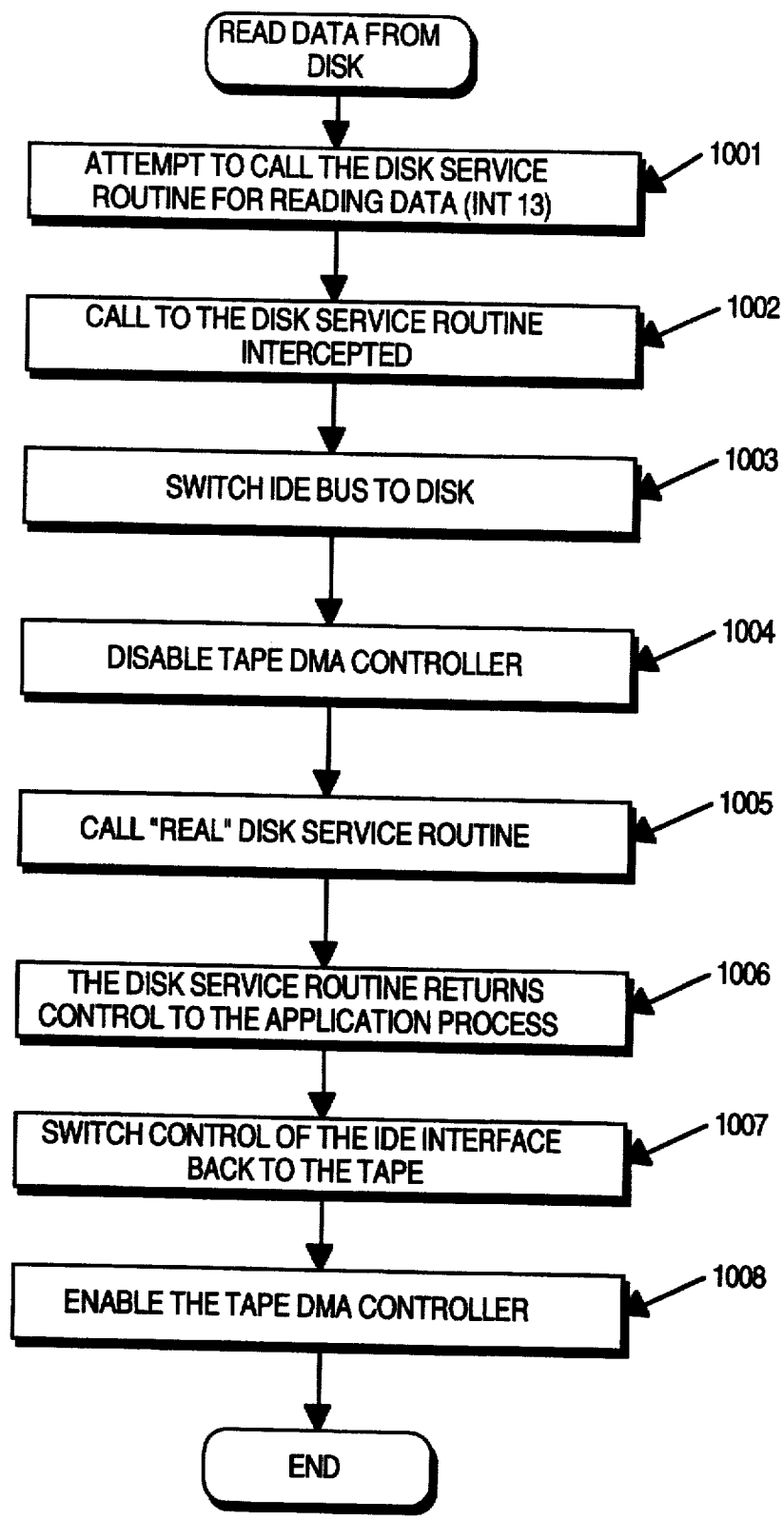
FIG. 10 is a flow diagram illustrating a method for reading information from disk as may be utilized by the present invention.

Referring now to FIG. 9, the processing of backing up data from the disk is essentially a loop in which, first, data is read from the disk, block 901; assuming there is more data to read, block 902, the data is blocked into 32K blocks and transferred to the tape drive, block 904. The process of reading data from the disk is explained in greater detail with reference to FIG. 10. This process essentially entails the "gatekeeper" process referred to earlier. Initially, the application program uses operating system calls, in the conventional manner, to request data be read from the disk. The operating system calls attempt to call the disk service routine (INT 13) at the address given by vector 1403. As discussed earlier, the application program had previously replaced the address of INT 13 with the address of gatekeeper function 1413. Therefore, the call to the disk service routine is intercepted by the application program, block 1003.

The application program then switches access to the IDE bus from the tape drive to the disk drive (the state of the drive select bit in the drive select register of both the tape and disk drive is inverted, e.g., changed from a 1 to a 0). The tape drive is then disabled from accepting further data transmitted on the bus by clearing the data request status bit 523. In this way, the tape drive is controlled to prevent it from mistakenly accepting data transferred on the interface from the disk drive to the host computer.

As previously noted, the application program has stored the address of the ROM BIOS INT 13 disk services routine. At this point, having disabled the tape from receiving further data and having set the disk select bit 521 to allow the disk drives task file registers to be programmed, the application program calls the ROM BIOS INT 13 disk services routine to initiate transfer of data from the disk to the host. The ROM BIOS INT 13 routine programs the disks task file registers and the disk begins execution of the command. As discussed previously with reference to FIG. 15, the disk will set its BUSY bit prevent other accesses to the bus during the time it is executing the command. Upon completion of execution of the command, the disk clears the BUSY bit and the ROM BIOS INT 13 routine returns control to the operating system routine. The operating system routine then returns control to the application process, block 1006.

The application program then proceeds to switch communications back to the tape drive by switching the state of the disk select bit (e.g., from a 0 to a 1), block 1007. The tape drives DMA transfer is then again enabled, block 1008, and the application process continues to transfer data to the tape.

The Restore Process

Figure 11:
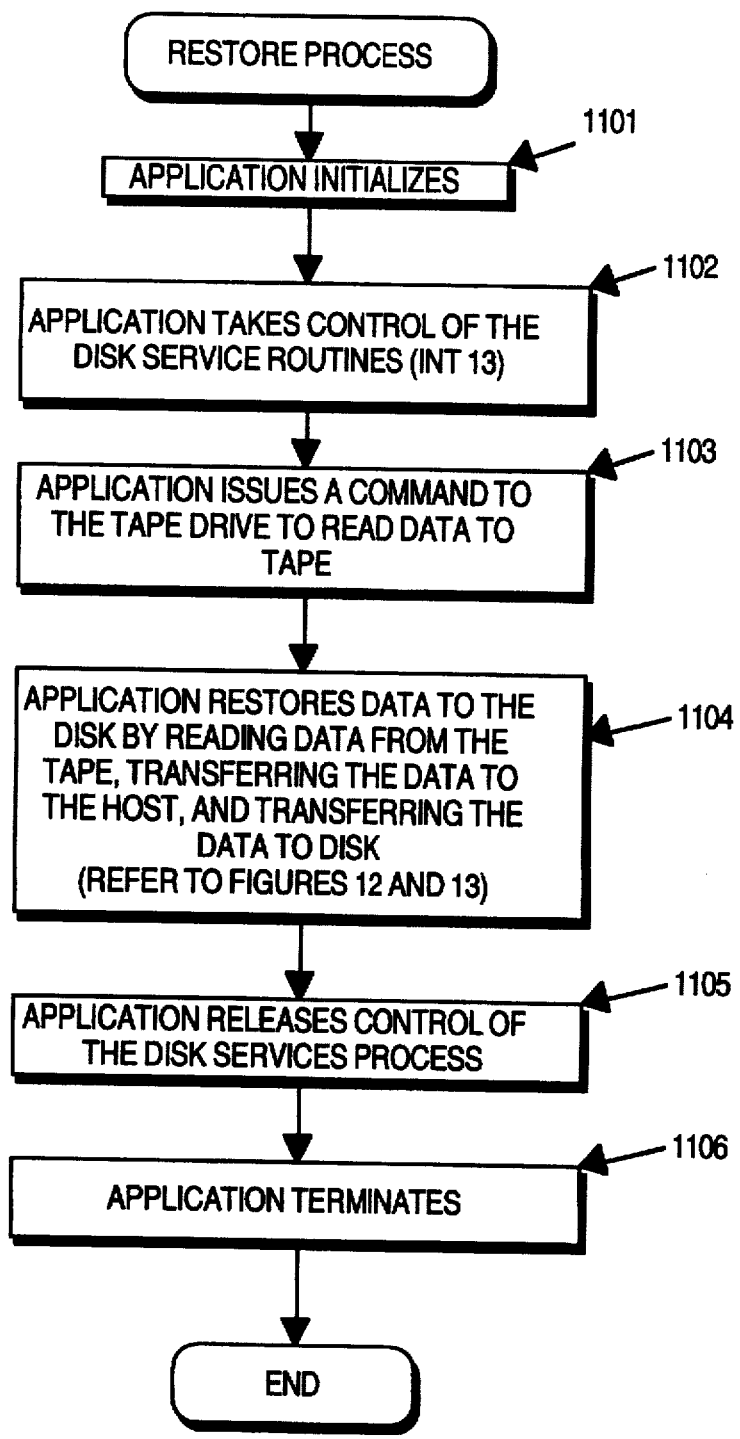
FIG. 11 is a flow diagram illustrating a data restore process as may be utilized by the present invention.
Figure 12:
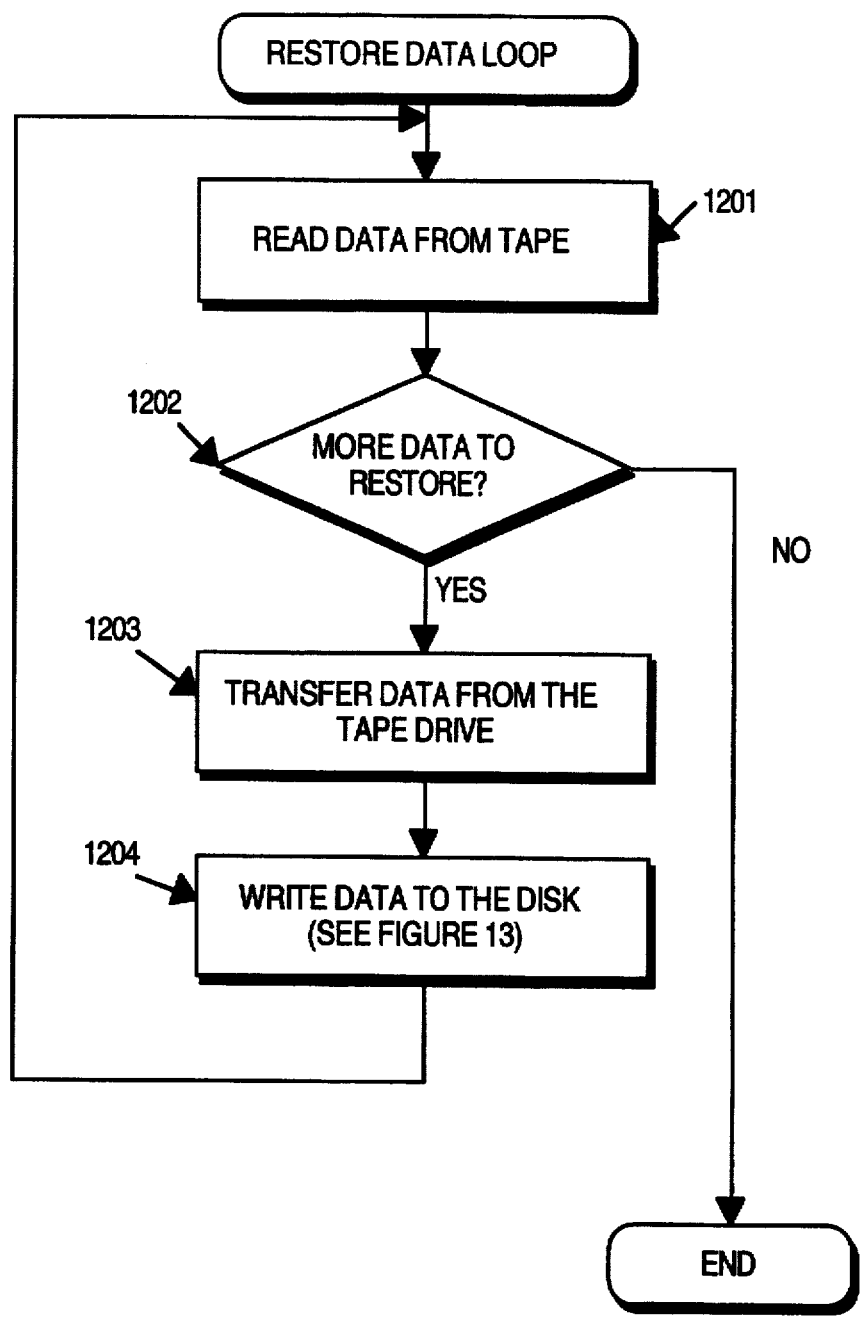
FIG. 12 is a flow diagram illustrating a restore data loop as may be utilized in the data restore process of the present invention.
Figure 13:
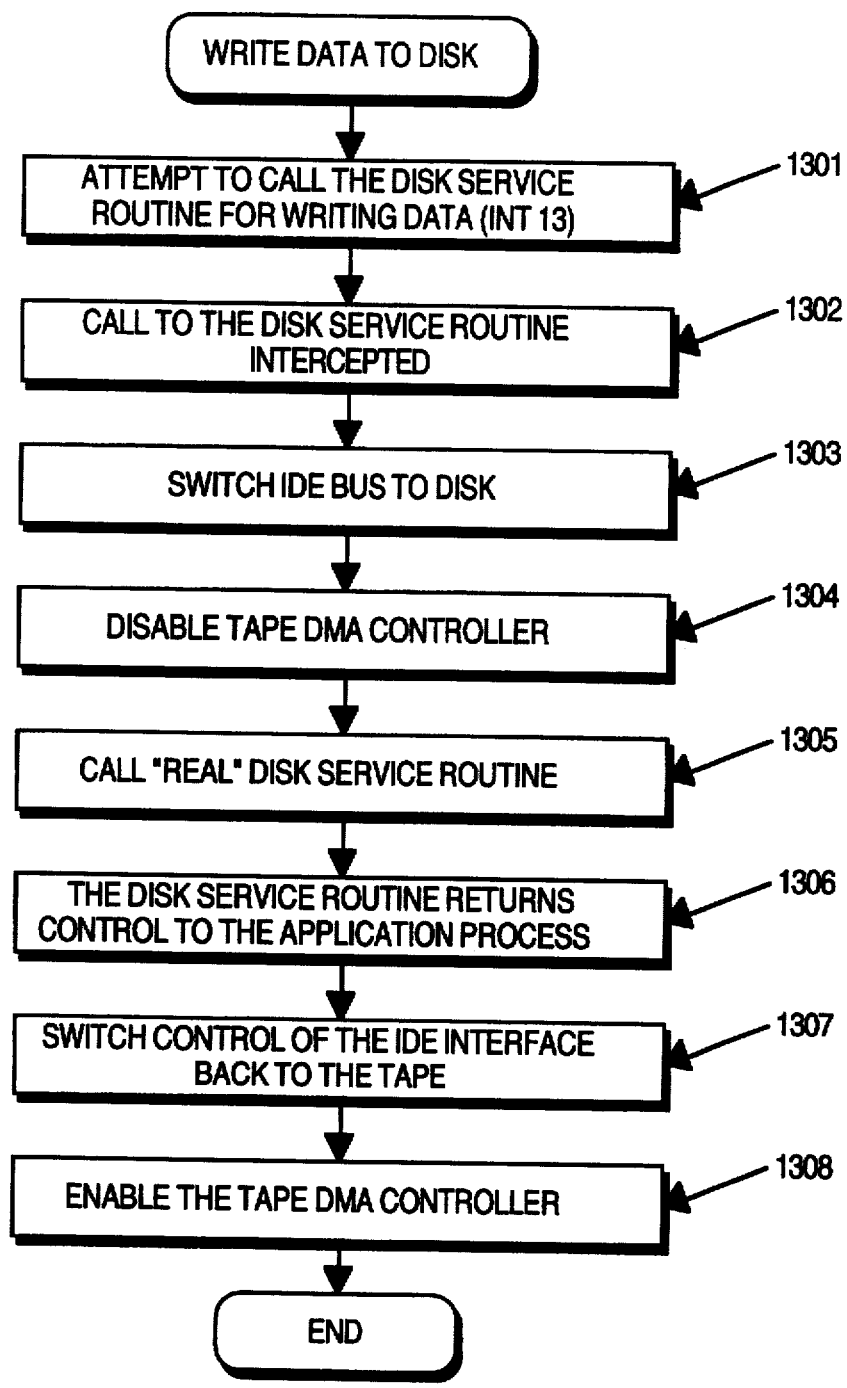
FIG. 13 is a flow diagram illustrating a method of writing information to a disk as may be utilized by the present invention.

FIGS. 11–13 illustrate the process of the preferred embodiment for restoring data from the tape to disk. The restore process is similar to the backup process and begins by initializing the application program, block 1101 and by the application process taking control of the disk services routine, block 1102. The application program then programs the tape drives task file registers to read data from tape, block 1103 and the tape drive begins reading data from the tape and transferring the data to its buffer memory 303 under control of controller 302. The tape drive then transfers the data across interface 301 to the host computer and the application program transfers the data to disk, block 1104 and continues this process until all requested data has been restored (see FIG. 12). Upon completion of the restore process, the application process releases control of the disk services processes, block 1105, and terminates, block 1106.

The process of transferring data from tape to disk of block 1104 is illustrated in greater detail with reference to FIG. 12 which illustrates that initially data is read from tape 1201. In the preferred embodiment, data is read from tape using the method and mechanisms described above. That is, first a command is issued by the host processor to the tape drive. The tape drive then proceeds to read data from tape and to store the data in its internal buffer. This process may continue without requiring access to the IDE interface (i.e., the tape drive is "offline"). As data is placed in the buffer it may be transferred to the host computer main memory 104 using a DMA transfer facility, block 1203. During the period of time that data is actually being transferred, the tape drive indicates to the host computer that the IDE interface is unavailable for other uses by setting its BUSY bit. After the data is transferred from the data buffer 303 of the tape drive to the main memory 104 of the host computer, the tape drive clears the BUSY bit allowing the tape application software to again control access to the bus.

The tape application software then begins the process of writing the data from the main memory 104 to disk, block 1204. During the period of time that data is being written to disk, the tape drive continues to process the read tape command and to store data in its on-board buffer memory 303.

FIG. 13 illustrates the process of writing data to disk, block 204, in greater detail. This process is similar to the process of FIG. 10 which illustrated reading data from disk. Initially, the tape application software calls standard operating system routines for accessing the tape drive. The operating system routines attempt to call the disk service routine, block 1301. As has been explained, especially with reference to FIG. 8, 11 and 14, the application program replaced the interrupt vectors of the ROM BIOS disk service routines with vectors to routines in the application process. Therefore, the calls by the operating system routines to the disk service routines are intercepted by the application process, block 1302. The application process then switches access to the IDE bus to disk, block 1303 by setting the disk select bit 522.

To the extent not already specifically discussed, it should be noted that the disk select bit 522 provides for control of which device coupled with the IDE bus is to be accessed. When the host writes the drive select register 503 to alter the state of the drive select bit, the task file registers of both the disk and tape drive are effected. Likewise, when other registers are written by the host, the task files of both drives are effected irregardless of which drive is selected by the drive select bit 522. In the system of the preferred embodiment, when issuing a command, the host computer first determines that the IDE bus is available by determining the state of the BUSY bit, 521. The host then writes the disk select register, 522 followed by the other registers needed for the operation and finally writes the command register 501 (as stated previously, the command register is a dual purpose register and is used as the status register while the drive is executing a command). The drives are each programmed such that only the drive selected by the drive select bit 522 will respond to the command. As soon as the command is written, the BUSY bit is set and the operation proceeds as has been described.

Again referring to FIG. 13, the tape drive responds to being deselected by disabling DMA transfers, block 1304, thus preventing inadvertent writing of data into its buffer memory during transfers on the IDE bus directed to the disk.

The application software then calls the ROM BIOS INT 13 disk service routine, block 1305. As a reminder, the application process has previously saved the address of this routine and, thus, has the address available to call directly without having to access the interrupt vector 1403. The disk service routine handles writing of data to the disk drive over the IDE interface. During the time that the write data command is being processed, the disk drive sets the BUSY bit. During the period of time when the BUSY bit is set, the disk drive performs DMA transfers from main memory 106.

Upon completion of writing of data, the disk service routine returns control to the application program, block 1306. The application program then writes the disk select bit 522 to select the tape drive, block 1307, and the tape drive again enables DMA writes from the tape's buffer memory to the main memory 104.

Thus, it can be seen that the present invention allows for effective simultaneous access to two independently controlled devices both coupled with a host computer through a single interface. This simultaneous access provides for improved performance of the devices, especially as described in connection with the system of the preferred embodiment, during tape backup and restore processes.

Tape Drive Interface with Standard Disk Controller Circuits

As one aspect of the present invention, it is taught to utilize industry standard disk drive controller circuits for control and interfacing of a tape drive. For example, as has been previously discussed, in the preferred embodiment a Cirrus Logic CL-SH-260 disk controller circuit is utilized as controller circuit 302. Responsive to the host interface 402 portion of the controller circuit 302 receiving a command from the host computer, the formatter portion of the circuit writes instructions to the writeable control store 409. An exemplary set of instructions is given with reference to FIG. 6. The instructions may include such information as a command 601, a segment address 603 and count 602. Initially, a command may be given such as command 0001 to begin tape movement, followed by a command such as a synchronize command 0002, a write address mark command (WAM), and a command to begin writing data from the buffer memory 0004.

It is noted that in the data archival system of the present invention it is highly desirable to provide for compatibility with existing tape formats. Unfortunately, such existing tape formats are not compatible with standard disk drive formats, and especially with the write formats produced by standard controller circuits such as the Cirrus Logic CL-SH-260.

One area of incompatibility is in the the area of writing address marks. In writing address marks to standard disk drive formats a single address mark byte is typically written. The standard controller circuits begin CRC calculations when the write address mark command is issued. Standard tape drive formats require writing of three consecutive address marks to tape. Unfortunately, in order to provide for accurate calculation of the CRC, it is not desirable have the controller circuit 302 issue three separate write address mark instructions. Therefore, what is desired is to provide circuitry which will effectively provide for separation of the write address mark and "start CRC" instructions in a standard disk controller circuit such as the SH-260.

The present invention implements such circuitry by providing in the NRZ to MFM encoder circuit 311 circuitry to effectively write three address marks each time an address mark is received from the controller circuit 311. This circuitry may be referred to as an address mark generator. In the preferred embodiment, encoder 311 is implemented as in a programmed logic array. In a similar fashion, when reading information from tape, the controller circuit is programmed to start CRC calculations upon receipt of each address mark. However, when reading standard tape formats, as has been discussed, three consecutive address marks are read from tape and it is required to begin calculation of the CRC with the first address mark and not to recalculate the CRC for each of the address marks. Therefore, the MFM to NRZ decoder 312 of the present invention provides address mark detection circuitry for detecting address marks and removing from the information transmitted to the controller two of three address marks in a sequence of three consecutive address marks. This is better illustrated with reference to FIG. 7(a) and FIG. 7(b).

Figure 7A:
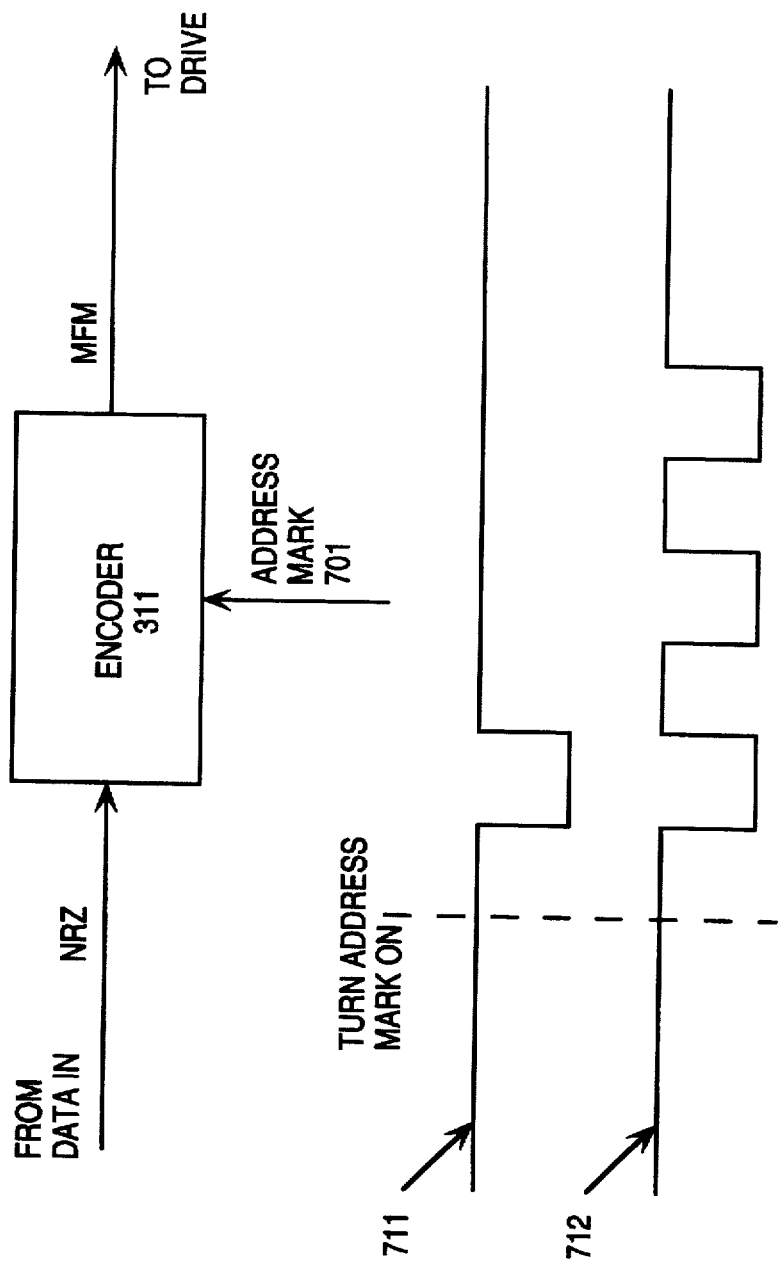
FIG. 7(a) is an illustration of an encoder circuit and corresponding timing information as may be utilized by the present invention.

FIG. 7(a) illustrates the encoder 311 which receives NRZ (non-return to zero) information from the controller circuit 302 and produces MRM (modified FM) output. The encoder includes circuitry 701 (coded in a PLA circuit) for detecting instructions to turn on the address mark on the NRZ input. In the prior art, as illustrated by signal 711, each "turn address mark on" instruction will result in one address mark being generated on the MFM output to the drive. The present invention provides for generation of three address marks responsive to each "turn address mark on" instruction as illustrated by signal 712.

Figure 7B:
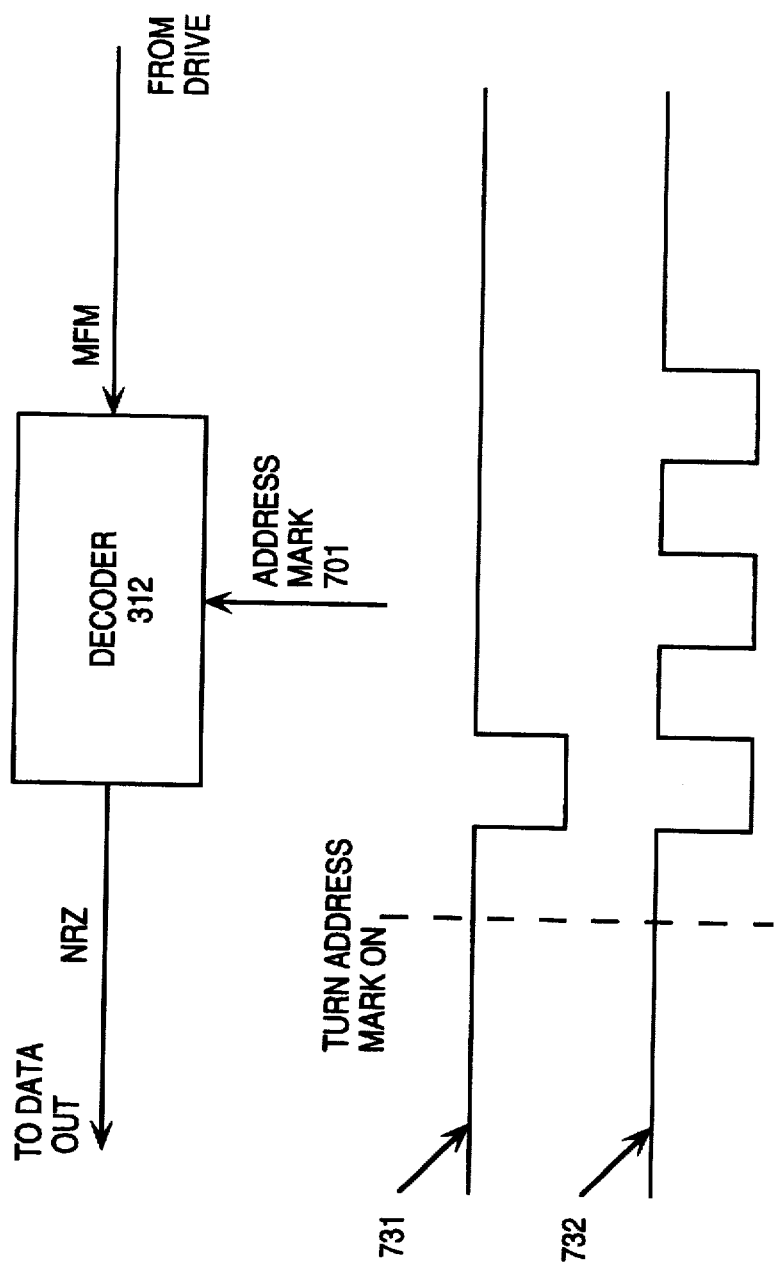
FIG. 7(b) is an illustration of a decoder circuit and corresponding timing information as may be utilized by the present invention.

In a similar fashion, as illustrated by FIG. 7(b), the present invention provides address mark detection circuitry which detects sequences of three address marks being read from the drive and being supplied on the MFM input to the decoder 312, such as the three address marks illustrated by signal 732. Responsive to detecting three consecutive address marks, decoder 312 provides a single address mark output on the NRZ output to controller circuit 302.

In this way, the present invention provides for compatibility with standard disk drive controller circuits allowing interface with the IDE bus while providing for compatibility with the format of existing tape backup systems.

Thus, what has been described is an improved apparatus and method for providing for data archival in a computer system. The described method is especially useful in computer systems utilizing the Intelligent Device Electronics (IDE) interface, such as may be utilized by IBM PC-ATs or compatibles.

What is claimed is:

1. A computer system comprising:
   (a) an interface for interfacing with at least a disk drive and a tape drive, wherein data can be transmitted over said interface by only one of said tape drive and said disk drive at any give time;
   (b) said disk drive coupled with said interface;
   (c) first indicator means coupled with said disk drive, said first indicator means having a first state for indicating said disk drive is executing a command and having a second state for indicating said disk drive is not executing a command;
   (d) said tape drive further coupled with said interface;
   (e) second indicator means coupled with said tape drive having a first state for indicating said tape drive is receiving information over said interface and having a second state for indicating said tape drive is not receiving information over said interface, wherein said interface is busy when either of said first and second indicator means are in said first state, and said interface is not busy when both said first and second indicator means are in said second state.

2. The computer system as recited by claim 1 further comprising:
   a circuit, coupled with said tape drive, formatting information received from said interface for storage on said tape drive.

3. The computer system as recited by claim 2 wherein said circuit further comprises a buffer management means and said tape drive further comprises a buffer memory managed under the control of said buffer management means.

4. The computer system as recited by claim 1 wherein said first indicator means comprises a bit in a task file register coupled with said disk driver.

5. The computer system as recited by claim 4 wherein said second indicator comprises a bit in a task file register coupled with said tape drive.

6. The computer system of claim 1, wherein said disk drive and said tape drive are coupled to said interface each using the same pin out and pin description.

7. A method comprising the steps of:
   transmitting from a host computer over a single interface to which a tape drive and a disk drive are coupled a first command to said tape drive, wherein data can be transmitted between said host computer and only one of said tape drive and said disk drive at any give time;
   releasing said single interface for use with said disk drive while said tape drive is accessing a tape medium in said tape drive responsive to said first command.

8. The method of claim 7 further comprising the steps of:
   transmitting data between said host computer and said disk drive over said single interface while said tape drive is accessing said tape medium in said tape drive responsive to said first command.

9. The method of claim 7 further comprising the steps of:
   transmitting from said host computer over said single interface a second command to said disk drive, wherein said second command is a read or write command; and
   releasing said single interface for use with said tape drive only after said disk drive has completed execution of said second command.

10. The method of claim 9 further comprising the steps of:
    said single interface receiving an interrupt signal over an interrupt line shared by said disk drive and said tape drive; and
    said host computer responding to said interrupt signal based on which of said disk drive and said tape drive currently control said interface.

11. The method of claim 7 further comprising the steps of:
    transmitting from said host computer over said single interface a second command to said disk drive, wherein said second command is a read or write command; and
    releasing said single interface for use with said tape drive only after said disk drive has completed accessing a disk storage medium in said disk drive responsive to said second command.

12. The method of claim 7 further comprising the steps of:
    said single interface receiving an interrupt signal over an interrupt line shared by said disk drive and said tape drive; and
    said host computer responding to said interrupt signal based on which of said disk drive and said tape drive currently control said interface.

13. The method of claim 7 wherein:
    said command is a read command; and
    said method further includes the step of,
       transmitting said data from said buffer in said tape drive to said host computer over said single interface after said step of releasing.

14. The method of claim 7, wherein said disk drive and said tape drive are each coupled to said single interface using connectors with the same pin out and pin description.

15. A method comprising the steps of:
    transmitting from a host computer over a single interface to which a data archival device and a disk drive are coupled a command to said data archival device, wherein data can be transmitted between said host computer and only one of said data archival device and said disk drive at any give time;
    transmitting data between said host computer and a buffer in said data archival device over said single interface responsive to said command;
    transmitting data between said buffer and a storage medium in said data archival device responsive to said command; and
    transmitting data between said host computer and said disk drive over said single interface simultaneous with at least part of said step of transmitting data between said buffer and said storage medium.

16. The method of claim 15, wherein said command is a write command and said step of transmitting data between said host computer and said buffer in said data archival device is performed before said step of transmitting data between said buffer and said storage medium in said data archival device.

17. The method of claim 15, wherein said command is a read command and said step of transmitting data between said host computer and said buffer in said data archival device is performed after said step of transmitting data between said buffer and said storage medium in said data archival device.

18. The method of claim 15 further comprising the steps of:

transmitting from said host computer over said single interface a second command to said disk drive, wherein said second command is a read or write command; and releasing said single interface for use with said data archival device only after said disk drive has completed execution of said second command.

19. The method of claim 18 further comprising the steps of:

said single interface receiving an interrupt signal over an interrupt line shared by said disk drive and said data archival device; and said host computer responding to said interrupt signal based on which of said disk drive and said data archival device currently control said interface.

20. The method of claim 15 further comprising the steps of:

said single interface receiving an interrupt signal over an interrupt line shared by said disk drive and said data archival device; and said host computer responding to said interrupt signal based on which of said disk drive and said data archival device currently control said interface.

21. The method of claim 15, wherein:

said step of transmitting from said host computer over said single interface the command to said data archival device includes the steps of, setting an indicator to indicate that said single interface is busy, transmitting from said host computer over said single interface to said data archival device a write command; and said step of transmitting data between said host computer and said disk drive includes the steps of, setting said indicator to indicate that said single interface is no longer busy, transmitting data between said host computer and said disk drive over said single interface, and writing at least some of said data from said buffer to said storage medium in said data archival device subsequent to said step of setting said indicator to indicate that said single interface is no longer busy and concurrently with said step of transmitting data between said host computer and said disk drive over said single interface.

22. The method of claim 15, wherein said disk drive and said data archival device are each coupled to said single interface using connectors having the same pin out and pin description.

23. A data archival device comprising:

a buffer for coupling to a host computer through an interface, said interface also being coupled to a disk drive, wherein said host computer can communicate data through said interface with only one of said data archival device and said disk drive at any given time;

a storage medium coupled to said buffer, said storage medium having a significantly slow transfer rate that said disk drive and said interface;

a first circuit to transfer data between said storage medium and said buffer responsive to commands from said host computer;

a second circuit to transfer data between said buffer and said host computer over said interface;

a third circuit for releasing said interface for use with said disk drive while data is being transferred between said storage medium and said buffer.

24. The data archival device of claim 23, wherein said data archival device uses the same pin out and pin description as said disk drive.

25. The data archival device of claim 23 further comprising:

a fourth circuit for generating interrupt signals for transmission to said host computer over an interrupt line shared with said disk drive.

26. The data archival device of claim 23, wherein said storage medium in a tape medium.

27. A computer system comprising:

a host computer;

an interface coupled to said host computer, wherein only one device can communicate with said host computer over said interface at any given time;

a disk drive coupled to said interface;

a data archival device coupled to said interface using the same pin out and pin description as said disk drive and including, a storage medium having a slower transfer rate than said interface and any disk storage medium in said disk drive;

a buffer coupled between said interface and said storage medium, and control circuitry to release said interface for use with said disk drive while data is being transferred between said storage medium and said buffer.

28. The computer system of claim 27, wherein said storage medium in said data archival device is a tape storage medium.

29. The computer system of claim 27, wherein said disk drive comprises:

a disk storage medium; and control circuitry to release said interface for use with said data archival device after data has been transferred between said disk storage medium and said host computer.

30. The computer system of claim 27, wherein said disk drive and said data archival device share a terminal in said interface for sending interrupt signals.

* * * * *

(12) EX PARTE REEXAMINATION CERTIFICATE (8344th)

United States Patent
Liu et al.

(10) Number: US 5,802,398 C1
(45) Certificate Issued: *Jun. 28, 2011

(54) METHOD AND APPARATUS FOR ALLOWING COMMUNICATION BETWEEN A HOST COMPUTER AND AT LEAST TWO STORAGE DEVICES OVER A SINGLE INTERFACE

(75) Inventors: Faan-Hoan Liu, Santa Cruz, CA (US); Jorge Gustavson, Santa Cruz, CA (US)

(73) Assignee: Synchrome Technology, Inc., Las Vegas, NV (US)

( * ) Notice: This patent issued on a continued prosecution application filed under 37 CFR 1.53(d), and is subject to the twenty year patent term provisions of 35 U.S.C. 154(a)(2).

Reexamination Request:
No. 90/010,814, Mar. 23, 2010
No. 90/011,156, Aug. 13, 2010

Reexamination Certificate for:
Patent No.: 5,802,398
Issued: Sep. 1, 1998
Appl. No.: 08/484,949
Filed: Jun. 7, 1995

Related U.S. Application Data

(62) Division of application No. 08/265,494, filed on Jun. 23, 1994, now Pat. No. 5,446,877, which is a continuation of application No. 08/105,478, filed on Aug. 12, 1993, now abandoned, which is a continuation of application No. 07/612,540, filed on Nov. 13, 1990, now abandoned.

(51) Int. Cl.
G06F 13/42 (2006.01)
G06F 3/06 (2006.01)

(52) U.S. Cl. .................................. 710/62; 710/5; 710/6
(58) Field of Classification Search .................... 395/882
See application file for complete search history.

(56) References Cited

U.S. PATENT DOCUMENTS

| | | |
|---|---|---|
| 4,053,752 A | 10/1977 | DeJohn et al. |
| 4,435,762 A | 3/1984 | Milligan et al. |
| 4,612,613 A | 9/1986 | Gershenson et al. |
| 4,672,613 A | 6/1987 | Foxworthy et al. |
| 4,689,767 A | 8/1987 | Stevenson et al. |
| 4,729,048 A | 3/1988 | Imakoshi et al. |
| 4,755,928 A | 7/1988 | Johnson et al. |
| 4,803,623 A | 2/1989 | Klashka et al. |
| 4,942,579 A | 7/1990 | Goodlander et al. |
| 4,979,056 A | 12/1990 | Squires et al. |
| 5,005,089 A | 4/1991 | Thanos et al. |
| 5,081,547 A | 1/1992 | Howell |
| 5,129,072 A | 7/1992 | Larner et al. |
| 5,133,060 A | 7/1992 | Weber et al. |
| 5,802,398 A | 9/1998 | Liu |

FOREIGN PATENT DOCUMENTS

| | | |
|---|---|---|
| JP | 59117653 | 7/1984 |
| JP | 1201754 | 8/1989 |
| WO | WO8902633 | 3/1989 |

OTHER PUBLICATIONS

Seagate Manual, At Interface Manual. Seagate Technology, Inc; Publication No. 36111–001, Rev. A May 6, 1989.

(Continued)

Primary Examiner—Alexander J. Kosowski

(57) ABSTRACT

A data archival device having an embedded controller compatible with a host computer interface for disk drives having embedded controllers. The data archival device provides for simultaneous writing of data to a tape media coupled with an interface of a host computer while reading of data from a disk coupled with the interface. This simultaneous access to both the tape and disk drives is accomplished through use of an application process for managing access to the tape drive, as well as controlling the tape drive to "own" the interface only during periods of time when information is being communicated over the interface. The tape drive may receive information over the interface into an on-board buffer and then release the interface to allow the host computer to access the disk drive. The tape drive may then continue "off-line" to write data to a tape media or to perform other functions not requiring communication of information over the interface.

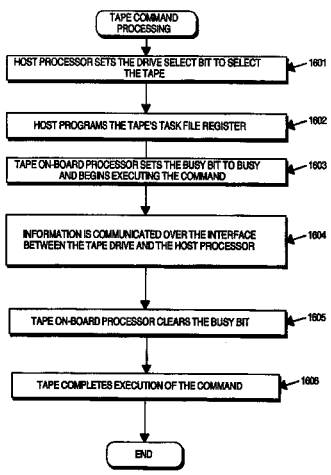

OTHER PUBLICATIONS

IBM Bulletin, Dec. 1981 IBM Technical Disclosure Bulletin, pp. 3552–3554.

ATA spec, ATA specification, X3T9.2/90–143. Revision 2.2, Aug. 15, 1990.

John Klonick and Mark Willstatter, "3.5–inch disk drives pack 331 and 425 Mbytes," EDN, v35.n13A (Jun. 28, 1990).

AT Attachment draft proposal, Rev. 2.2 (Aug. 15, 1990).

ANSI Small Computer System Interface (SCSI) standard, X3.131–1986 (Jun. 23, 1986).

Steve Goldman, "Disk Controllers Standardized with EATA," Unixworld, Dec. 1989, pp. 111–112.

William F. Dines, Jr. et al., "Performance Measurement of Buffered Tape," (1984).

Kenneth J. Hallam, "Standalone Unit Satisfies Storage and Backup Needs," Computer Design (Apr. 1985).

Richard Brechtlein, "An Intelligent Interface for Disk/Tape Systems," Computer Design (1982).

American National Standard for Information Systems: Intelligent Peripheral Interface—Physical Level, approved Apr. 24, 1986, American National Standards Institute, Inc.

D. Lieberman, "IPI controller board talks to two disks at once," Computer Design, vol. 27, No. 20, Nov. 1, 1988, p. 25.

Draft Proposed SCSI–2 Standard, Rev. 10b (Aug. 22, 1989).

Emulex MT02 Tape Controller (Technical Manual Jun. 1986).

Kennedy Auto–Load Digital Tape system (Installation and Operation Manual, Feb. 1988; Operation and Maintenance Manual, Feb. 1989).

Cipher Tape Drive Model F880ES (Technical Manual Nov. 1989).

Cirrus Logic CL–SH250 Datasheet.

IBM Technical Disclosure Bulletin, vol. 25, No. 2 (Jul. 1982).

Email from George Penokie to X3T9.2 Committee, Dec. 12, 1990.

Draft ATA Proposal, Rev. 1.5, Oct. 12, 1989.

"Proposed Interface Could Take the Pain out of Connecting Peripherals," Byte, Jan. 1990.

Aseo, "Disk/Tape Controllers Declare Independence with SCSI," Digital Design, Jul. 1985.

Randy H. Katz, et al., "Disk System Architectures for High Performance Computing," Proceedings of the IEEE, vol. 77, No. 12, Dec. 1989.

Emulex VH01 VMEBus SCSI/Floppy Host Adapter Programmer's Reference Manual, Nov. 1989.

Viper Product Manual, SCSI Models 2060S and 2150S.

Emulex MT02 (Titleist) Tape Controller Technical Manual (Jun. 1986).

ATA (AT Attachment) draft proposal, Rev. 1.0, Common Access Method Committee, (Apr. 1, 1989) (hereinafter "ATA Draft Proposal, Rev. 1.0.").

ATA (AT Bus Attachment) and EATA, Rev 1.2A (Enhanced AT Bus Attachment) draft proposal, Common Access Method Committee, (Jun. 7, 1989) (hereinafter "ATA Draft Proposal, Rev. 1.2").

ATA (AT Bus Attachment) and EATA, Rev 1.4 (Enhanced AT Bus Attachment) draft proposal, Common Access Method Committee, (Aug. 18, 1989) (hereinafter "ATA Draft Proposal, Rev. 1.4").

ATA (AT Bus Attachment) draft proposal, Rev. 1.6, Common Access Method Committee, (Nov. 11, 1989) (hereinafter "ATA Rev. 1.6").

ATA (AT Bus Attachment) draft proposal, Rev. 1.7, Common Access Method Committee, (Dec. 1, 1989) (hereinafter "ATA Rev. 1.7").

ATA (AT Bus Attachment) draft proposal, Rev. 1.8, Common Access Method Committee, (Jan. 12, 1990) (hereinafter "ATA Rev. 1.8").

ATA (AT Bus Attachment) draft proposal, Rev. 1.9, Common Access Method Committee, (Mar. 12, 1990) (hereinafter "ATA Rev. 1.9").

ATA (AT Bus Attachment) draft proposal, Rev. 2.0, Common Access Method Committee, (Apr. 20, 1990) (hereinafter "ATA Rev. 2.0".

ATA (AT Bus Attachment) draft proposal, Rev. 2.1, Common Access Method Committee, (Jun. 11, 1990) (hereinafter "ATA Rev. 2.1").

Draft Proposed ANSI Small Computer System Interface (SCSI) X3T9.2/82–2, Revision 17B (Dec. 16, 1985).

*AT Interface Manual*; Publication No. 36111–001, Rev. A. Seagate Technology, Inc. May 6, 1989; Scotts Valley, California.

*Device Controller for Microprocessor Systems*; Dec. 1981 IBM Technical Disclosure Bulletin, pp. 3552–3554.

*ATA Specification*(draft revision 2.2); Common Access Method Committee, Aug. 15, 1990; Saratoga, California.

EX PARTE REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

Claims 1-30 are cancelled.

* * * * *